(12) United States Patent
Wilcox et al.

(10) Patent No.: US 9,823,089 B1
(45) Date of Patent: Nov. 21, 2017

(54) UNMANNED AERIAL VEHICLE SENSOR CALIBRATION AS PART OF DEPARTURE FROM A MATERIALS HANDLING FACILITY

(71) Applicant: Amazon Technologies, Inc., Seattle, WA (US)

(72) Inventors: Scott Michael Wilcox, Bothell, WA (US); Naimisaranya Das Busek, Seattle, WA (US); Trevor Josph Myslinski Decker, Pittsburgh, PA (US); Michael William Regner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/188,917

(22) Filed: Jun. 21, 2016

(51) Int. Cl.
| | | |
|---|---|---|
| *G05D 1/00* | (2006.01) | |
| *G01C 25/00* | (2006.01) | |
| *B64C 39/02* | (2006.01) | |
| *B64D 47/08* | (2006.01) | |
| *G06Q 10/08* | (2012.01) | |

(52) U.S. Cl.
CPC ............ *G01C 25/00* (2013.01); *B64C 39/024* (2013.01); *B64D 47/08* (2013.01); *G06Q 10/083* (2013.01); *B64C 2201/128* (2013.01)

(58) Field of Classification Search
USPC ............................................................ 701/7
See application file for complete search history.

(56) References Cited

U.S. PATENT DOCUMENTS

| | | |
|---|---|---|
| 3,970,848 A | 7/1976 | Schott et al. |
| 4,385,354 A | 5/1983 | Hornfeld et al. |
| 4,395,354 A | 7/1983 | Gutnick et al. |

(Continued)

FOREIGN PATENT DOCUMENTS

| | | |
|---|---|---|
| DE | 19521600 A1 | 12/1996 |
| DE | 102012212517 A1 | 7/2013 |

(Continued)

OTHER PUBLICATIONS

Mahulikar, Shripad P. et al., "Infrared signature studies of aerospace vehicles", Progress in Aerospace Sciences 43, 2007, pp. 218-245.

(Continued)

*Primary Examiner* — Tyler Paige
(74) *Attorney, Agent, or Firm* — Athorus, PLLC

(57) ABSTRACT

This disclosure describes systems, methods, and apparatus for automating the verification of aerial vehicle sensors as part of a pre-flight, flight departure, in-transit flight, and/or delivery destination calibration verification process. At different stages, aerial vehicle sensors may obtain sensor measurements about objects within an environment, the obtained measurements may be processed to determine information about the object, as presented in the measurements, and the processed information may be compared with the actual information about the object to determine a variation or difference between the information. If the variation is within a tolerance range, the sensor may be auto adjusted and operation of the aerial vehicle may continue. If the variation exceeds a correction range, flight of the aerial vehicle may be aborted and the aerial vehicle routed for a full sensor calibration.

20 Claims, 14 Drawing Sheets

(56) References Cited

U.S. PATENT DOCUMENTS

| | | | |
|---|---|---|---|
| 4,816,828 A | 3/1989 | Feher | |
| 6,023,061 A | 2/2000 | Bodkin | |
| 6,422,508 B1* | 7/2002 | Barnes | F41G 3/14 244/3.15 |
| 8,719,317 B1* | 5/2014 | Crain | H04L 67/12 707/736 |
| 9,230,335 B2 | 1/2016 | Karlov et al. | |
| 9,607,219 B2 | 3/2017 | Greveson et al. | |
| 2006/0058928 A1* | 3/2006 | Beard | G05D 1/101 701/11 |
| 2007/0286526 A1 | 12/2007 | Abousleman et al. | |
| 2009/0212976 A1 | 8/2009 | Pautsch et al. | |
| 2010/0017114 A1 | 1/2010 | Tehan et al. | |
| 2010/0042269 A1 | 2/2010 | Kokkeby et al. | |
| 2010/0100269 A1 | 4/2010 | Ekhaguere et al. | |
| 2010/0121601 A1 | 5/2010 | Eckert | |
| 2010/0256841 A1 | 10/2010 | Garrec et al. | |
| 2011/0282580 A1 | 11/2011 | Mohan | |
| 2012/0035789 A1 | 2/2012 | He | |
| 2012/0215385 A1 | 8/2012 | He et al. | |
| 2014/0163781 A1 | 6/2014 | Vian et al. | |
| 2014/0168461 A1 | 6/2014 | Dani et al. | |
| 2014/0197982 A1* | 7/2014 | Wang | G08G 5/0008 342/37 |
| 2015/0158587 A1 | 6/2015 | Patrick et al. | |
| 2015/0248584 A1 | 9/2015 | Greveson et al. | |
| 2016/0070265 A1 | 3/2016 | Liu et al. | |
| 2016/0076892 A1 | 3/2016 | Zhou et al. | |
| 2016/0139603 A1 | 5/2016 | Bianchi et al. | |
| 2016/0189101 A1 | 6/2016 | Kantor et al. | |
| 2016/0245899 A1 | 8/2016 | Rybski | |
| 2016/0261811 A1 | 9/2016 | Dent et al. | |
| 2016/0343118 A1 | 11/2016 | Olsen | |
| 2016/0376031 A1* | 12/2016 | Michalski | B64F 1/36 701/15 |
| 2017/0092138 A1 | 3/2017 | Trundle et al. | |
| 2017/0234724 A1 | 8/2017 | Naguib et al. | |

FOREIGN PATENT DOCUMENTS

| | | |
|---|---|---|
| FR | 2648904 B1 | 10/1991 |
| JP | 2011203159 A | 10/2011 |

OTHER PUBLICATIONS

Shi, Weiqun et al., "Detecting, tracking, and identifying airborne threats with netted sensor fence", from: Sensor Fusion—Foundation and Applications, Dr. Ciza Thomas (Ed.), ISBN: 978-953-307-446-7, 2011, pp. 139 to 158.

* cited by examiner

UNMANNED AERIAL VEHICLE SENSOR CALIBRATION AS PART OF DEPARTURE FROM A MATERIALS HANDLING FACILITY

BACKGROUND

A digital image is a collection of pixels, typically arranged in an array, which defines an optically formed reproduction of one or more objects, backgrounds or other features of a scene. In a digital image, each of the pixels represents or identifies a color or other light condition associated with a portion of such objects, backgrounds or features. For example, a black-and-white digital image includes a single bit for representing a light condition of the pixel in a binary fashion (e.g., either black or white), while a grayscale digital image may represent the light condition in multiple bits (e.g., two to eight bits for defining tones of gray in terms of percentages or shares of black-and-white), and a color digital image may include groups of bits corresponding to each of a plurality of base colors (e.g., red, green or blue), and the groups of bits may collectively represent a color associated with the pixel. One common digital image is a twenty-four bit (24-bit) color digital image, in which each of the pixels includes three channels of eight bits each, including a first channel of eight bits for describing an extent of red within a pixel, a second channel of eight bits for describing an extent of green within the pixel, and a third channel of eight bits for describing an extent of blue within the pixel.

A depth image, or depth map, is also a collection of pixels that defines an optically formed reproduction of one or more objects, backgrounds or other features of a scene. Unlike the pixels of a digital image, however, each of the pixels of a depth image represents or identifies not a light condition or color of such objects, backgrounds or features, but a distance to objects, backgrounds or features. For example, a pixel of a depth image may represent a distance between a sensor of an imaging device that captured the depth image (e.g., a depth camera or range sensor) and the respective object, background or feature to which the pixel corresponds.

Digital images and/or depth images are often used to aid in aerial navigation of an aerial vehicle, such as unmanned aerial vehicles ("UAV"). However, calibration of the camera or cameras coupled to the aerial vehicle is often a time consuming task that may delay a departure of the aerial vehicle.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
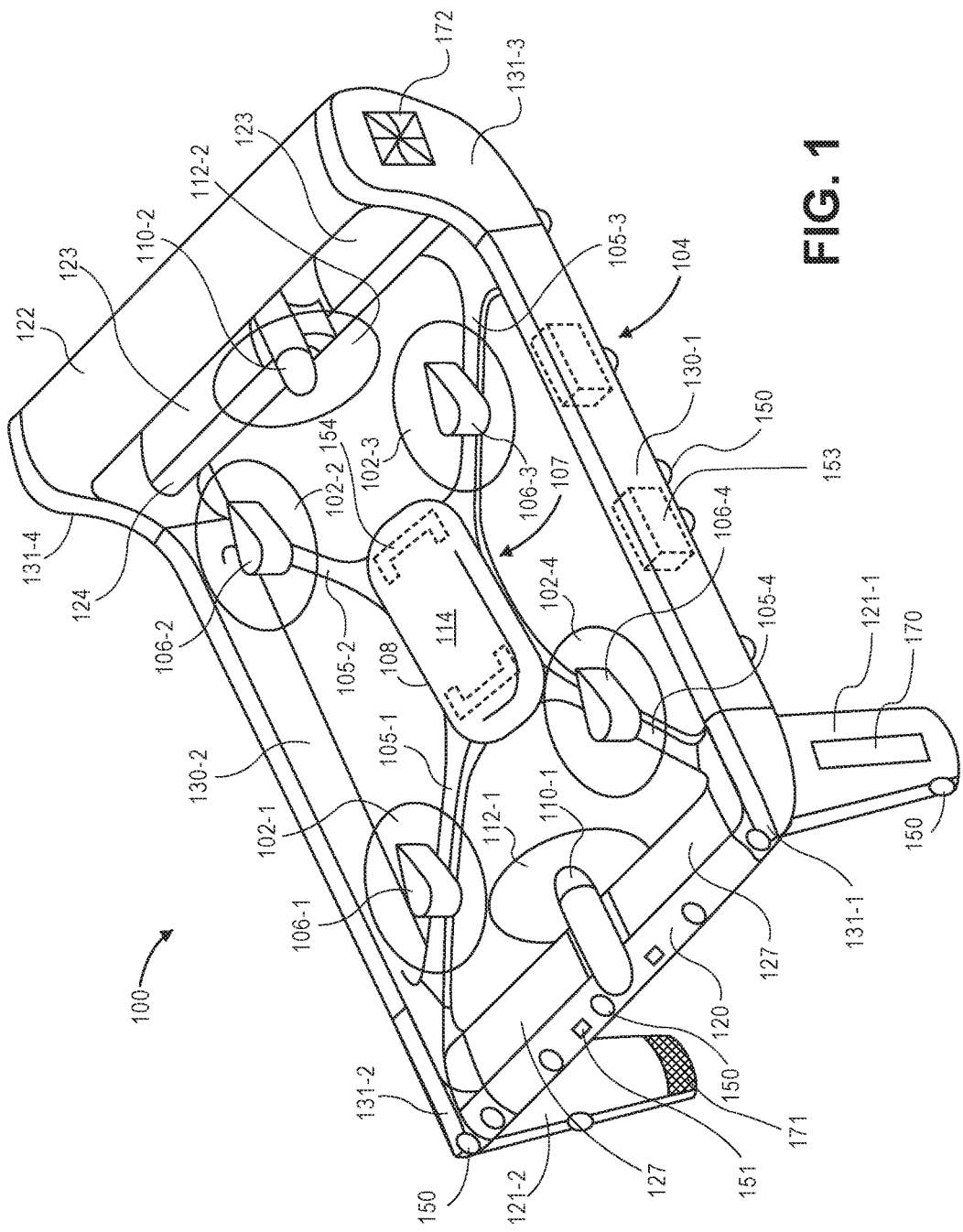
FIG. 1 depicts a view of an unmanned aerial vehicle configuration, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to." Additionally, as used herein, the term "coupled" may refer to two or more components connected together, whether that connection is permanent (e.g., welded) or temporary (e.g., bolted), direct or indirect (i.e., through an intermediary), mechanical, chemical, optical, or electrical. Furthermore, as used herein, "horizontal" flight refers to flight traveling in a direction substantially parallel to the ground (i.e., sea level), and that "vertical" flight refers to flight traveling substantially radially outward from the earth's center. It should be understood by those having ordinary skill that trajectories may include components of both "horizontal" and "vertical" flight vectors.

DETAILED DESCRIPTION

This disclosure describes an aerial vehicle, such as an unmanned aerial vehicle ("UAV"), that includes a plurality of cameras and/or other sensors in which the calibration of the camera and/or other sensors may be autonomously verified and, in some instances, adjusted to improve the calibration. For example, the aerial vehicle may be configured to obtain images of one or more objects that are positioned at known locations within an environment in which the aerial vehicle is operating. Images of those objects are then processed to determine processed information (e.g., size, shape, color, position, orientation) corresponding to the object as represented in the image. The processed information is then compared with actual information about the object to determine a variation between the determined processed information and the actual information. If the variation exceeds a threshold, it may be determined that the aerial vehicle is to be removed from operation and the camera and/or other sensors fully calibrated, which may be manually performed. If the variation is within a variation range, operation of the aerial vehicle continues. In some instances, the calibration of the camera and/or sensor for which the variation was detected may be adjusted to account for the variation. For example, a software correction may be applied to the sensor information to account for the determined variation.

In addition to aerial vehicle sensor calibration performed by the aerial vehicle, one or more calibration channels that are separate from the aerial vehicle, and/or an aerial vehicle management system that is separate from the aerial vehicle, may be configured to obtain information about the aerial vehicle and determine if calibration of the camera and/or other sensors of the aerial vehicle need to be calibrated prior to a flight of the aerial vehicle. For example, a calibration verification channel may be positioned within or adjacent a materials handling facility and an aerial vehicle may aerially navigate through the channel as the aerial vehicle is departing the materials handling facility. The channel may include a plurality of cameras and/or other sensors (e.g., distance determining elements, microphones) that obtain information about the aerial vehicle as the aerial vehicle passes through the channel. The obtained information is processed to determine if one or more of the sensors of the aerial vehicle need to be calibrated.

For example, the aerial vehicle management system may receive sensor information from one or more sensors positioned within the channel and receive sensor information from the aerial vehicle corresponding to one or more aerial vehicle sensors. The different sets of sensor information may be compared to determine a variation between the sensor information determined from the channel sensors and the sensor information received from the aerial vehicle sensors. In one example, images of the aerial vehicle obtained from cameras positioned within the channel may be processed to determine an actual heading, an actual velocity, an actual speed, or an actual pose of the aerial vehicle. Likewise, heading, velocity, speed, or pose information, as recorded by one or more sensors of the aerial vehicle, may be received from the aerial vehicle. The sensor information received from the aerial vehicle is compared with the actual information determined from the channel sensor to determine a variation. The variation may be, for example, a difference between a determined actual pose of the aerial vehicle and a pose of the aerial vehicle as received from the aerial vehicle. If the variation exceeds a threshold, flight of the aerial vehicle may be aborted and the aerial vehicle routed to a calibration station for a full calibration of the sensor. If the variation does not exceed the threshold but is within a variation range, operation of the aerial vehicle may continue. Likewise, in some examples, a software correction may be provided to the aerial vehicle that is applied to pose information as recorded by the aerial vehicle sensor to account for the variation.

In some implementations, one or more sensors, components, or structural aspects of the aerial vehicle may be verified prior to flight of the aerial vehicle. For example, the aerial vehicle may be secured (e.g., tethered) to a shuttle such that the aerial vehicle is unable to aerially navigate or takeoff from the shuttle. While secured to the shuttle, the aerial vehicle may be powered and may activate, for example, one or more motors. One or more sensors, such as a camera, microphone, pressure sensor, and/or laser, that are separate from the aerial vehicle, may obtain information about the aerial vehicle as the motor is powered and rotating. The obtained information is then processed to determine an operability of the aerial vehicle. For example, a sound generated by the aerial vehicle and recorded by the microphone may be processed to determine a frequency, amplitude, and/or intensity of sound generated by the rotation of the motor and/or propeller coupled to the motor. That frequency, amplitude, and/or intensity is compared with an expected frequency that is known for that motor and/or motor/propeller pair. A difference between the expected frequency, amplitude, and/or intensity and the recorded frequency, amplitude, and/or intensity may be indicative of a potential motor failure and/or a structural problem with the aerial vehicle.

As another example, images that include representations of at least a portion of the aerial vehicle obtained by the camera may be processed to determine an amount of vibration, deflection, or other movement of the aerial vehicle, or a motor arm of the aerial vehicle that occurs as the aerial vehicle is powering the motor. If the movement exceeds an expected threshold, it may be indicative of a potential hardware or structural failure of the aerial vehicle. If the amount of movement is below the threshold, an indication may be provided that at least that portion of the aerial vehicle has successfully completed that test and, according to that test, is approved for flight.

In still further implementations, one or more mechanical and/or structural aspects of the aerial vehicle may be analyzed prior to flight of the aerial vehicle. For example, images of the aerial vehicle may be obtained and processed to confirm that the structural components of the aerial vehicle are intact. For example, structural information (e.g., size, position/angle of joints, coupling locations, wire positioning, etc.) of the aerial vehicle may be known to the aerial vehicle management system. Images of the aerial vehicle may be obtained and processed to confirm that all physical aspects of the aerial vehicle correspond to the expected physical aspects of the aerial vehicle. If one or more of the determined physical aspects do not correspond to the stored, expected physical aspects, the aerial vehicle management system may cause the aerial vehicle to be routed for manual review of the structure of the aerial vehicle. If all determined physical aspects do correspond to the stored, expected physical aspects, it may be determined that the aerial vehicle has successfully completed a pre-flight structural validation.

FIG. 1 illustrates a view of an aerial vehicle, in this instance a UAV 100, according to an implementation. As illustrated, the UAV 100 includes a perimeter frame 104 that includes a front wing 120, a lower rear wing 124, an upper rear wing 122, and two horizontal side rails 130-1, 130-2. The horizontal side rails 130 are coupled to opposing ends of the front wing 120 and opposing ends of the upper rear wing 122 and lower rear wing 124. In some implementations, the coupling may be with a corner junction, such as the front left corner junction 131-1, the front right corner junction 131-2, the rear left corner junction 131-3, and the rear right corner junction 131-4. In such an example, the corner junctions are also part of the perimeter frame 104.

The components of the perimeter frame 104, such as the front wing 120, lower rear wing 124, upper rear wing 122, side rails 130-1, 130-2, and corner junctions 131 may be formed of any one or more suitable materials, such as graphite, carbon fiber, aluminum, titanium, etc., or any combination thereof. In the illustrated example, the components of the perimeter frame 104 of the UAV 100 are each formed of carbon fiber and joined at the corners using corner junctions 131. The components of the perimeter frame 104 may be coupled using a variety of techniques. For example, if the components of the perimeter frame 104 are carbon fiber, they may be fitted together and joined using secondary bonding, a technique known to those of skill in the art. In other implementations, the components of the perimeter frame 104 may be affixed with one or more attachment mechanisms, such as screws, rivets, latches, quarter-turn fasteners, etc., or otherwise secured together in a permanent or removable manner.

The front wing 120, lower rear wing 124, and upper rear wing 122 are positioned in a tri-wing configuration and each wing provides lift to the UAV 100 when the UAV is moving in a direction that includes a horizontal component. For example, the wings may each have an airfoil shape that causes lift due to the airflow passing over the wings during horizontal flight.

Opposing ends of the front wing 120 may be coupled to a corner junction 131, such as the front left corner junction 131-1 and front right corner junction 131-2. In some implementations, the front wing may include one or more flaps 127, or ailerons, that may be used to adjust the pitch, yaw, and/or roll of the UAV 100 alone or in combination with the lifting motors 106, lifting propellers 102, thrusting motors 110, thrusting propellers 112, and/or other flaps on the rear wings, discussed below. In some implementations, the flaps 127 may also be used as a protective shroud to further hinder access to the lifting propellers 102 by objects external to the UAV 100. For example, when the UAV 100 is moving in a vertical direction or hovering, the flaps 127 may be extended to increase the height of the protective barrier around a portion of the lifting propellers 102.

In some implementations, the front wing 120 may include two or more pairs of flaps 127, as illustrated in FIG. 1. In other implementations, for example, if there is no front thrusting motor 110-1, the front wing 120 may only include a single flap 127 that extends substantially the length of the front wing 120. If the front wing 120 does not include flaps 127, the lifting motors 106 and lifting propellers 102, thrusting motors 110, thrusting propellers 112 and/or flaps of the rear wings may be utilized to control the pitch, yaw, and/or roll of the UAV 100 during flight.

Opposing ends of the lower rear wing 124 may be coupled to a corner junction 131, such as the rear left corner junction 131-3 and rear right corner junction 131-4. In some implementations, the lower rear wing may include one or more flaps 123 or ailerons that may be used to adjust the pitch, yaw and/or roll of the UAV 100 alone or in combination with the lifting motors 106, lifting propellers 102, thrusting motors 110, thrusting propellers 112, and/or the flaps 127 of the front wing. In some implementations, the flaps 123 may also be used as a protective shroud to further hinder access to the lifting propellers 102 by objects external to the UAV 100. For example, when the UAV 100 is moving in a vertical direction or hovering, the flaps 123 may be extended, similar to the extending of the front flaps 127 of the front wing 120.

In some implementations, the rear wing 124 may include two or more flaps 123, as illustrated in FIG. 1, or two or more pairs of flaps, respectively. In other implementations, for example, if there is no rear thrusting motor 110-2 mounted to the lower rear wing, the rear wing 124 may only include a single flap 123 that extends substantially the length of the lower rear wing 124. In other implementations, if the lower rear wing includes two thrusting motors, the lower rear wing may be configured to include three flaps 123, one on either end of the lower rear wing 124, and one between the two thrusting motors mounted to the lower rear wing 124.

Opposing ends of the upper rear wing 122 may be coupled to a corner junction 131, such as the rear left corner junction 131-3 and rear right corner junction 131-4. In some implementations, like the lower rear wing, the upper rear wing 122 may include one or more flaps (not shown) or ailerons that may be used to adjust the pitch, yaw and/or roll of the UAV 100 alone or in combination with the lifting motors 106, lifting propellers 102, thrusting motors 110, thrusting propellers 112, and/or other flaps of other wings. In some implementations, the flaps may also be used as a protective shroud to further hinder access to the lifting propellers 102 by objects external to the UAV 100. For example, when the UAV 100 is moving in a vertical direction or hovering, the flaps may be extended, similar to the extending of the front flaps 127 of the front wing 120 or the flaps 123 of the lower rear wing 124.

The front wing 120, lower rear wing 124, and upper rear wing 122 may be positioned and sized proportionally to provide stability to the UAV while the UAV 100 is moving in a direction that includes a horizontal component. For example, the lower rear wing 124 and the upper rear wing 122 are stacked vertically such that the vertical lift vectors generated by each of the lower rear wing 124 and upper rear wing 122 are close together, which may be destabilizing during horizontal flight. In comparison, the front wing 120 is separated from the rear wings longitudinally such that the vertical lift vector generated by the front wing 120 acts together with the vertical lift vectors of the lower rear wing 124 and the upper rear wing 122, providing efficiency, stabilization and control.

In some implementations, to further increase the stability and control of the UAV 100, one or more winglets 121, or stabilizer arms, may also be coupled to and included as part of the perimeter frame 104. In the example illustrated with respect to FIG. 1, there are two front winglets 121-1 and 121-2 mounted to the underneath side of the front left corner junction 131-1 and the front right corner junction 131-2, respectively. The winglets 121 extend in a downward direction approximately perpendicular to the front wing 120 and side rails 130. Likewise, the two rear corner junctions 131-3, 131-4 are also formed and operate as winglets providing additional stability and control to the UAV 100 when the UAV 100 is moving in a direction that includes a horizontal component.

The winglets 121 and the rear corner junctions 131 may have dimensions that are proportional to the length, width, and height of the UAV 100 and may be positioned based on the approximate center of gravity of the UAV 100 to provide stability and control to the UAV 100 during horizontal flight. For example, in one implementation, the UAV 100 may be approximately 64.75 inches long from the front of the UAV 100 to the rear of the UAV 100 and approximately 60.00 inches wide. In such a configuration, the front wing 120 has dimensions of approximately 60.00 inches by approximately 7.87 inches. The lower rear wing 124 has dimensions of approximately 60.00 inches by approximately 9.14 inches. The upper rear wing 122 has dimensions of approximately 60.00 inches by approximately 5.47 inches. The vertical separation between the lower rear wing and the upper rear wing is approximately 21.65 inches. The winglets 121 are approximately 6.40 inches wide at the corner junction with the perimeter frame of the UAV, approximately 5.91 inches wide at the opposing end of the winglet and approximately 23.62 inches long. The rear corner junctions 131-3, 131-4 are approximately 9.14 inches wide at the end that couples with the lower rear wing 124, approximately 8.04 inches wide at the opposing end, and approximately 21.65 inches long. The overall weight of the UAV 100 is approximately 50.00 pounds.

Coupled to the interior of the perimeter frame 104 is a central frame 107. The central frame 107 includes a hub 108 and motor arms 105 that extend from the hub 108 and couple to the interior of the perimeter frame 104. In this example, there is a single hub 108 and four motor arms 105-1, 105-2, 105-3, and 105-4. Each of the motor arms 105 extend from approximately a corner of the hub 108 and couple or terminate into a respective interior corner of the perimeter frame. In some implementations, each motor arm 105 may couple into a corner junction 131 of the perimeter frame 104. Like the perimeter frame 104, the central frame 107 may be formed of any suitable material, such as graphite, carbon fiber, aluminum, titanium, etc., or any combination thereof. In this example, the central frame 107 is formed of carbon fiber and joined at the corners of the perimeter frame 104 at the corner junctions 131. Joining of the central frame 107 to the perimeter frame 104 may be done using any one or more of the techniques discussed above for joining the components of the perimeter frame 104.

Lifting motors 106 are coupled at approximately a center of each motor arm 105 so that the lifting motor 106 and corresponding lifting propeller 102 are within the substantially rectangular shape of the perimeter frame 104. In one implementation, the lifting motors 106 are mounted to an underneath or bottom side of each motor arm 105 in a downward direction so that the propeller shaft of the lifting motor that mounts to the lifting propeller 102 is facing downward. In other implementations, as illustrated in FIG. 1, the lifting motors 106 may be mounted to a top of the motor arms 105 in an upward direction so that the propeller shaft of the lifting motor that mounts to the lifting propeller 102 is facing upward. In this example, there are four lifting motors 106-1, 106-2, 106-3, 106-4, each mounted to an upper side of a respective motor arm 105-1, 105-2, 105-3, and 105-4.

In some implementations, multiple lifting motors may be coupled to each motor arm 105. For example, while FIG. 1 illustrates a quad-copter configuration with each lifting motor mounted to a top of each motor arm, a similar configuration may be utilized for an octo-copter. For example, in addition to mounting a motor 106 to an upper side of each motor arm 105, another lifting motor may also be mounted to an underneath side of each motor arm 105 and oriented in a downward direction. In another implementation, the central frame may have a different configuration, such as additional motor arms. For example, eight motor arms may extend in different directions and a lifting motor may be mounted to each motor arm.

The lifting motors may be any form of motor capable of generating enough rotational speed with the lifting propellers 102 to lift the UAV 100 and any engaged payload, thereby enabling aerial transport of the payload.

Mounted to each lifting motor 106 is a lifting propeller 102. The lifting propellers 102 may be any form of propeller (e.g., graphite, carbon fiber) and of a size sufficient to lift the UAV 100 and any payload engaged by the UAV 100 so that the UAV 100 can navigate through the air, for example, to deliver a payload to a delivery location. For example, the lifting propellers 102 may each be carbon fiber propellers having a dimension or diameter of twenty-four inches. While the illustration of FIG. 1 shows the lifting propellers 102 all of a same size, in some implementations, one or more of the lifting propellers 102 may be different sizes and/or dimensions. Likewise, while this example includes four lifting propellers 102-1, 102-2, 102-3, 102-4, in other implementations, more or fewer propellers may be utilized as lifting propellers 102. Likewise, in some implementations, the lifting propellers 102 may be positioned at different locations on the UAV 100. In addition, alternative methods of propulsion may be utilized as "motors" in implementations described herein. For example, fans, jets, turbojets, turbo fans, jet engines, internal combustion engines, and the like may be used (either with propellers or other devices) to provide lift for the UAV.

In addition to the lifting motors 106 and lifting propellers 102, the UAV 100 may also include one or more thrusting motors 110 and corresponding thrusting propellers 112. The thrusting motors and thrusting propellers may be the same or different than the lifting motors 106 and lifting propellers 102. For example, in some implementations, the thrusting propellers may be formed of carbon fiber and be approximately eighteen inches long. In other implementations, the thrusting motors may utilize other forms of propulsion to propel the UAV. For example, fans, jets, turbojets, turbo fans, jet engines, internal combustion engines, and the like may be used (either with propellers or with other devices) as the thrusting motors.

The thrusting motors and thrusting propellers may be oriented at approximately ninety degrees with respect to the perimeter frame 104 and central frame 107 of the UAV 100 and utilized to increase the efficiency of flight that includes a horizontal component. For example, when the UAV 100 is traveling in a direction that includes a horizontal component, the thrusting motors may be engaged to provide a horizontal thrust force via the thrusting propellers to propel the UAV 100 horizontally. As a result, the speed and power utilized by the lifting motors 106 may be reduced. Alternatively, in selected implementations, the thrusting motors may be oriented at an angle greater or less than ninety degrees with respect to the perimeter frame 104 and the central frame 107 to provide a combination of thrust and lift.

In the example illustrated in FIG. 1, the UAV 100 includes two thrusting motors 110-1, 110-2 and corresponding thrusting propellers 112-1, 112-2. Specifically, in the illustrated example, there is a front thrusting motor 110-1 coupled to and positioned near an approximate mid-point of the front wing 120. The front thrusting motor 110-1 is oriented such that the corresponding thrusting propeller 112-1 is positioned inside the perimeter frame 104. The second thrusting motor is coupled to and positioned near an approximate mid-point of the lower rear wing 124. The rear thrusting motor 110-2 is oriented such that the corresponding thrusting propeller 112-2 is positioned inside the perimeter frame 104.

While the example illustrated in FIG. 1 illustrates the UAV with two thrusting motors 110 and corresponding thrusting propellers 112, in other implementations, there may be fewer or additional thrusting motors and corresponding thrusting propellers. For example, in some implementations, the UAV 100 may only include a single rear thrusting motor 110 and corresponding thrusting propeller 112. In another implementation, there may be two thrusting motors and corresponding thrusting propellers mounted to the lower rear wing 124. In such a configuration, the front thrusting motor 110-1 may be included or omitted from the UAV 100. Likewise, while the example illustrated in FIG. 1 shows the thrusting motors oriented to position the thrusting propellers inside the perimeter frame 104, in other implementations, one or more of the thrusting motors 110 may be oriented such that the corresponding thrusting propeller 112 is oriented outside of the protective frame 104.

The perimeter frame 104 provides safety for objects foreign to the UAV 100 by inhibiting access to the lifting propellers 102 from the side of the UAV 100, provides protection to the UAV 100, and increases the structural integrity of the UAV 100. For example, if the UAV 100 is traveling horizontally and collides with a foreign object (e.g., wall, building), the impact between the UAV 100 and the foreign object will be with the perimeter frame 104, rather than a propeller. Likewise, because the frame is interconnected with the central frame 107, the forces from the impact are dissipated across both the perimeter frame 104 and the central frame 107.

The perimeter frame 104 also provides a surface upon which one or more components of the UAV 100 may be mounted. Alternatively, or in addition thereto, one or more components of the UAV may be mounted or positioned within the cavity of the portions of the perimeter frame 104. For example, one or more antennas may be mounted on or in the front wing 120. The antennas may be used to transmit and/or receive wireless communications. For example, the antennas may be utilized for Wi-Fi, satellite, near field communication ("NFC"), cellular communication, or any other form of wireless communication. Other components or sensors, such as imaging elements (e.g., cameras), time of flight sensors, accelerometers, inclinometers, distance-determining elements, barometers, magnetic sensors, gimbals, Global Positioning System (GPS) receiver/transmitter, radars, illumination elements, speakers, and/or any other component of the UAV 100 or the aerial vehicle control system (discussed below), etc., may likewise be mounted to or in the perimeter frame 104. Likewise, identification or reflective identifiers, such as identifiers 170, 171, 172 may be mounted to the perimeter frame 104 to aid in the identification of the UAV 100.

In some implementations, as discussed below, multiple imaging elements 150, such as digital still cameras, red, green, blue (RGB) cameras, video cameras, thermographic cameras, etc., may be mounted to and spaced about the frame of the UAV 100. Likewise, one or more distance determining elements 151 may be coupled to the frame of the aerial vehicle. Any type of distance determining element may be utilized, including, but not limited to, a time-of-flight sensor, range finder, Sound Navigation and Ranging ("SONAR"), Light Detection and Ranging ("LIDAR"), etc.

As illustrated, the imaging elements 150 may be affixed to any portion of the frame of the UAV 100. For example, imaging elements 150 may be arranged along the front of the front wing 120. As another example, imaging elements 150 may be arranged along the underneath or lower side of the side rail 130-1. As will be appreciated, any number of imaging elements may be included on any portion of the frame 104 and oriented in any position. In some implementations, imaging elements 150 may be positioned such that approximately all areas around the aerial vehicle are within a field of view of at least one imaging element 150.

In some implementations, the perimeter frame 104 may also include a permeable material (e.g., mesh, screen) that extends over the top and/or lower surface of the perimeter frame 104 enclosing the central frame, lifting motors, and/or lifting propellers.

An aerial vehicle control system 114 is also mounted to the central frame 107. In this example, the aerial vehicle control system 114 is mounted to the hub 108 and is enclosed in a protective barrier. The protective barrier may provide the control system 114 weather protection so that the UAV 100 may operate in rain and/or snow without disrupting the control system 114. In some implementations, the protective barrier may have an aerodynamic shape to reduce drag when the UAV is moving in a direction that includes a horizontal component. The protective barrier may be formed of any materials including, but not limited to, graphite-epoxy, Kevlar, and/or fiberglass. In some implementations, multiple materials may be utilized. For example, Kevlar may be utilized in areas where signals need to be transmitted and/or received.

Likewise, the UAV 100 includes one or more power modules 153. In some implementations, the power modules 153 may be positioned inside a cavity of the side rails 130-1, 130-2. In other implementations, the power modules 153 may be mounted or positioned at other locations of the UAV. The power modules 153 for the UAV may be in the form of battery power, solar power, gas power, super capacitor, fuel cell, alternative power generation source, or a combination thereof. The power module(s) are coupled to and provide power for the aerial vehicle control system 114, the lifting motors 106, the thrusting motors 110, the imaging elements 150, the payload engagement mechanism 154, and/or other components and/or sensors of the aerial vehicle.

In some implementations, one or more of the power modules 153 may be configured such that it can be autonomously removed and/or replaced with another power module while the UAV is landed or in flight. For example, when the UAV lands at a location, the UAV may engage with a charging member at the location that will recharge the power module.

As mentioned above, the UAV 100 may also include a payload engagement mechanism 154. The payload engagement mechanism 154 may be configured to engage and disengage items and/or containers that hold items (payload). In this example, the payload engagement mechanism 154 is positioned beneath and coupled to the hub 108 of the frame 104 of the UAV 100. The payload engagement mechanism 154 may be of any size sufficient to securely engage and disengage a payload. In other implementations, the payload engagement mechanism 154 may operate as the container in which it contains item(s). The payload engagement mechanism 154 communicates with (via wired or wireless communication) and is controlled by the aerial vehicle control system 114.

Figure 2:
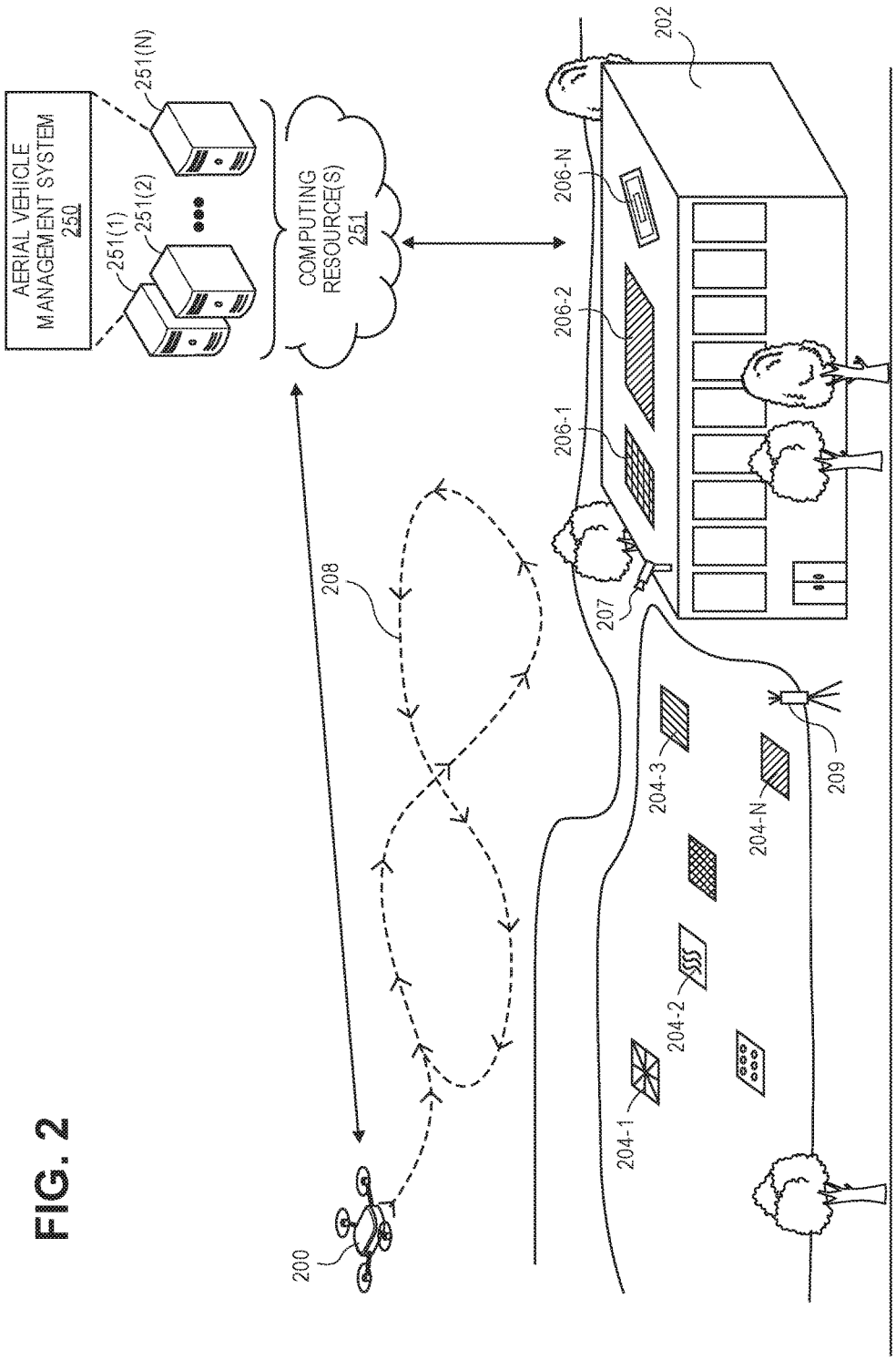
FIG. 2 depicts an unmanned aerial vehicle performing sensor calibration, according to an implementation.

FIG. 2 depicts an aerial vehicle 200 performing sensor calibration as the aerial vehicle is departing and/or returning to a materials handling facility 202, according to an implementation. A materials handling facility, as used herein, may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of material (inventory) handling. In some implementations, the aerial vehicle 200 may be utilized to aerially transport an item from the materials handling facility to a customer specified delivery destination. For example, a customer may order or purchase an item through an electronic-commerce website and request that the item be delivered to a specific delivery destination (e.g., the customer's home). The item may be picked from an inventory location within the materials handling facility and secured to the aerial vehicle 200 for transport. The aerial vehicle may depart from the materials handling facility and aerially navigate to the customer specified delivery destination to complete the delivery of the item.

Rather than require a full calibration of sensors prior to flight departure of the aerial vehicle from the materials handling facility, the implementations described herein provide a system, method, and apparatus to verify the calibration of the sensors of the aerial vehicle as part of the preparation for departure of the aerial vehicle. If it is determined that the calibration of the sensors is within an expected tolerance range, the aerial vehicle is allowed to continue flight without requiring a full calibration. If the calibration exceeds the expected tolerance range, a full calibration of one or more sensors on the aerial vehicle may be performed prior to departure. As discussed below, in some implementations, regardless of whether the sensors are within the expected tolerance range, a full calibration may be periodically performed.

Returning to FIG. 2, as part of a departure of the aerial vehicle 200 from the materials handling facility 202 and/or as part of a return of the aerial vehicle 200 to the materials handling facility 202, the aerial vehicle may aerially navigate a specific flight path 208 over one or more markers 204 so that the one or more markers are within a field of view of one or more cameras coupled to the aerial vehicle 200, as discussed above with respect to FIG. 1.

The markers 204 are at known positions adjacent the materials handling facility. Likewise, the markers are placed at a known orientation, have a known size, known shape, known color, and/or known pattern. In some implementations, the marker may be similar to a marker that will be positioned at a customer specified delivery destination. Known marker information (size, shape, position, orientation, color, pattern, etc.) is referred to herein as actual information. Reference to actual information is intended to include one or more known items of information about one or more markers. Actual information may be maintained in a data store accessible to the aerial vehicle management system 250 and/or the aerial vehicle 200. Alternatively, or in addition thereto, actual information may be stored in a memory of the aerial vehicle 200.

Any number of markers, such as markers 204-1, 204-2, 204-3-204-N may be positioned adjacent the materials handling facility 202. In some implementations, in addition to or as an alternative to the markers 204 positioned adjacent the materials handling facility, one or more markers 206-1, 206-2-206-N, having a known size, shape, position, orientation, color, pattern, etc., may be affixed to or otherwise included on an exterior of the materials handling facility 202. In such an example, rather than or in addition to aerially navigating over the markers 204, the aerial vehicle may navigate over the markers 206 such that one or more of the markers 206 are within a field of view of one or more cameras of the aerial vehicle 200.

It will be appreciated that the aerial vehicle need not aerially navigate directly over the markers to facilitate the described implementations. Rather, any aerial navigation by the aerial vehicle such that one or more of the markers 204, 206 are within a field of view of one or more cameras coupled to the aerial vehicle is sufficient.

The images obtained by the aerial vehicle 200 that include representations of the markers 204, 206 are provided to an aerial vehicle management system 250. The aerial vehicle management system 250 may be operating on one or more remote computing resources 251. The remote computing resources 251 may form a portion of a network-accessible computing platform implemented as a computing infrastructure of processors, storage, software, data access, and other components that is maintained and accessible via a network. The aerial vehicle 200 and/or the materials handling facility 202 may communicatively couple to the computing resources 251 via a network which may represent wired technologies (e.g., wires, USB, fiber optic cable, etc.), wireless technologies (e.g., RF, cellular, satellite, Bluetooth, etc.), and/or other connection technologies.

As illustrated, the computing resources 251 may include one or more servers, such as servers 251(1), 251(2), . . . , 251(N). These servers 251(1)-(N) may be arranged in any number of ways, such as server farms, stacks, and the like that are commonly used in data centers. Furthermore, the servers 251(1)-(N) may include one or more processors and memory which may store the aerial vehicle management system 250.

The aerial vehicle management system 250 may process the received images to determine, among other information, a size, shape, position, orientation, color, pattern, and/or other information about the markers based on the representation of the markers in the received images. Such information is referred to herein as processed information and corresponds to information about the markers that is determined from a processing of images obtained from cameras coupled to the aerial vehicle. Processed information is intended to include one or more of determined aspects of information about one or more markers as determined from processing the image information.

The aerial vehicle management system 250 may then compare the processed information with actual information to determine a variation between the processed information and the actual information. For example, a size variation may be determined by comparing a size of the marker, as determined from the processed image, with an actual size of the marker, as maintained in a data store. As another example, a shape variation may be determined by comparing a shape of the marker, as determined from the processed image, with an actual shape of the marker, as maintained in the data store. As another example, a color variation may be determined by comparing a color of the marker, as determined from the processed image, with an actual color of the marker, as maintained as actual information in the data store. As another example, a pattern variation may be determined by comparing a pattern of the marker, as determined from the processed image, with an actual pattern of the marker, as maintained in the data store.

If one or more of the variations exceed a correction threshold, the aerial vehicle may be instructed to land and be scheduled for a full calibration of the camera(s) coupled to the aerial vehicle. In comparison, if the variations are within an expected tolerance range, the aerial vehicle may be allowed to continue flight. In some implementations, the aerial vehicle management system may send instructions to the aerial vehicle 200 to adjust the calibration of the camera. Such instructions may account for the difference between the information determined from the image and the actual information.

In some implementations, the aerial vehicle may provide other sensor information obtained from other sensors coupled to the aerial vehicle. For example, the aerial vehicle may provide sensor information indicating a heading of the aerial vehicle, an altitude of the aerial vehicle, a pose of the aerial vehicle, a speed of the aerial vehicle, a velocity of the aerial vehicle, etc. Likewise, one or more cameras within the environment, such as camera 207 affixed to the materials handling facility 202 may obtain images of the aerial vehicle 200 as the aerial vehicle follows the flight path 208. The images obtained by the camera 207 may be processed to determine an actual heading of the aerial vehicle, an actual pose of the aerial vehicle, an actual speed of the aerial vehicle, a velocity of the aerial vehicle, etc. For example, a series of images may be obtained by the camera 207 and processed to determine an amount of movement of the aerial vehicle over a period of time and, thus, calculate the actual speed and/or the actual velocity. Likewise, images from cameras 207 in the environment may be processed to determine a heading or a pose of the aerial vehicle by determining a direction of travel of the aerial vehicle over a period of time by detecting, using object recognition, a marker on the aerial vehicle that can be used to determine an orientation or pose of the aerial vehicle, etc.

Likewise, in some implementations, one or more other sensors that are external to the aerial vehicle 200 and positioned adjacent or on the materials handling facility 202 may obtain information about the aerial vehicle as the aerial vehicle navigates the flight path 208. For example, a distance determining element 209 (a sensor), such as a time of flight sensor, LIDAR, SONAR, etc., may be positioned adjacent a departure location of the materials handling facility 202 and be configured to measure a distance between a distance determining element and the UAV. In such an example, the aerial vehicle may provide altitude information as determined by a sensor of the aerial vehicle 200 and the aerial vehicle management system may compare the measured actual distance (and any offset based on the location of the distance determining element) and the received altitude (processed information) to determine whether a variation between the actual distance and the processed information is within an altitude tolerance range. If it is determined that the variation is within an altitude variation range, the aerial vehicle may be allowed to continue a flight toward the customer specified delivery destination. Likewise, instructions may be sent that cause a software correction in an amount corresponding to the altitude variation. If the altitude variation exceeds a correction threshold, it may be determined that the sensor of the aerial vehicle is out of calibration and flight of the aerial vehicle toward the customer specified delivery destination aborted so that a full calibration of the aerial vehicle sensor may be performed.

While the above examples discuss the aerial vehicle management system receiving images and/or other sensor information from the aerial vehicle and/or the camera 207 and processing the information, in other implementations, the aerial vehicle control system of the aerial vehicle may process the information to determine if the cameras of the aerial vehicle and/or other sensors are calibrated. For example, the actual information may be maintained in a memory of the aerial vehicle control system of the aerial vehicle 200. The aerial vehicle control system of the aerial vehicle 200 may receive images from one or more cameras coupled to the aerial vehicle 200, process the images to determine processed information and compare the processed information with the actual information to determine a variation for the cameras. Based on the determined variation, the aerial vehicle may either terminate flight of the aerial vehicle and route itself for full calibration, alter the calibration of the camera if the variation is within a tolerance threshold, and/or continue the flight to a destination.

Figure 3:
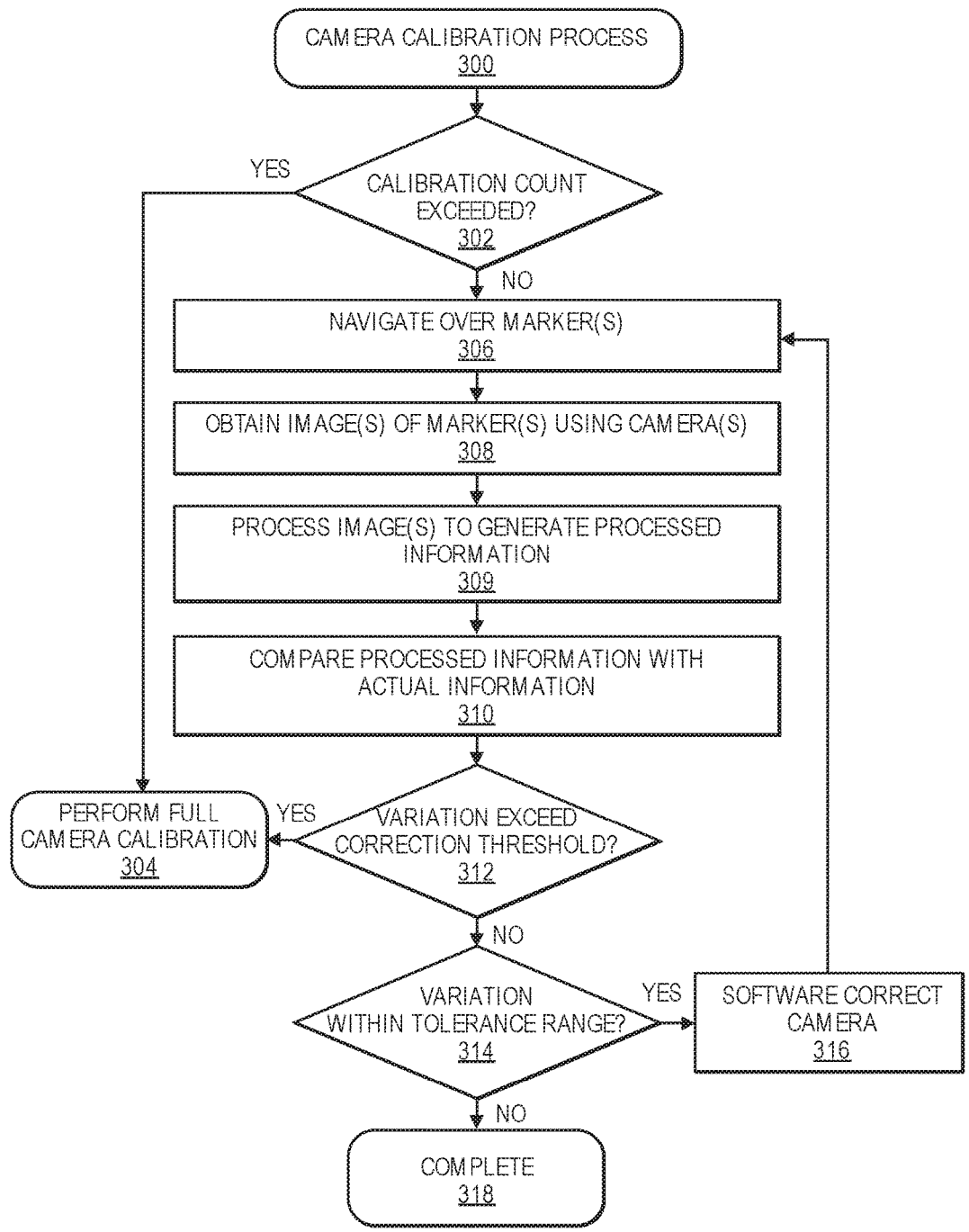
FIG. 3 is a flow diagram illustrating an example camera calibration validation process, according to an implementation.

FIG. 3 is a flow diagram illustrating a camera calibration process 300, according to an implementation. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 300 may be performed periodically for an aerial vehicle. For example, the example process may be performed each time an aerial vehicle is preparing to depart a materials handling facility, each time an aerial vehicle is returning to a materials handling facility, etc. The example process 300 begins by determining if a calibration count has been exceeded for the aerial vehicle, as in 302. A calibration count may be any defined quantity that when exceeded results in a full calibration of the cameras of the aerial vehicle being performed. For example, the calibration count may relate to a number of flights performed by the aerial vehicle since a last full calibration, a number of flight hours of the aerial vehicle since a last calibration, or any other criteria.

If it is determined that the calibration count has been exceeded, instructions are sent that cause the aerial vehicle to be routed to a calibration station for a full calibration of the cameras of the aerial vehicle, as in 304. In some implementations, the instructions may cause the aerial vehicle to aerially navigate to a calibration station. In other implementations, the instructions may cause the aerial vehicle to land and the aerial vehicle may be routed to the calibration station using other mechanisms.

If it is determined that the calibration count has not been exceeded, instructions are sent that cause the aerial vehicle to navigate over one or more markers that are at known positions adjacent or on a materials handling facility, as in 306. As discussed above, the aerial vehicle need not specifically navigate over the markers but instead navigate such that the markers are within a field of view of a camera of the aerial vehicle. When the aerial vehicle is navigating such that the one or more markers are in the field of view of one or more cameras of the aerial vehicle, one or more images of the marker are obtained using the camera of the aerial vehicle, as in 308. The obtained images are processed to generate processed information corresponding to the marker as represented in the images, as in 309. For example, one or more image processing algorithms such as an edge detection algorithm, object detection algorithm, etc., may be utilized to process the image and determine processed information.

The processed information from the image is then compared with actual information for each of the one or more markers, as in 310. As discussed above, actual information may be maintained in a data store and provide information as to a size, shape, color, position, pattern, orientation, etc., for a marker. The comparison identifies a difference or variation between the processed information and the actual information. For example, if a calibration of the camera is off, the size, shape, color, etc., of the marker as indicated in the processed information and determined from a processing of the image of the marker will not be consistent with the actual information.

A determination is then made as to whether the variation exceeds a correction threshold, as in 312. A correction threshold may be any defined amount of variation that is an upper limit that is allowable for continued operation of the aerial vehicle without a full calibration of the camera. The correction threshold may vary for different aerial vehicles, different times of day, different days of year, different destinations, etc. In one implementation, the calibration threshold may be exceeded if the variation between the processed information and the actual information is more than eight percent.

If it is determined that the variation exceeds the correction threshold, instructions are sent that cause the aerial vehicle to terminate a flight and be routed to a calibration station for a full camera calibration, as in 304. If it is determined that the correction threshold has not been exceeded, a determination is made as to whether the variation is within a tolerance range, as in 314. The tolerance range may be any range of variation below the correction threshold. For example, the tolerance range may be any variation between two percent and eight percent of variation. In other implementations, the tolerance range may be any variation below the correction threshold. A lower limit may be beneficial as some variation between the processed information and actual information may be expected due to environmental conditions and/or other factors impacting the image creation of the marker by the camera.

If it is determined that the variation is within a tolerance range, instructions are sent that result in an adjustment, or software correction of the variation, as in 316. For example, adjustment instructions may be sent that cause the aerial vehicle to adjust image information based on a difference determined as the variation. Upon providing instructions to adjust or software correct the camera calibration, the example process returns to block 306 and continues. In some implementations, rather than returning to block 306 and continuing, the example process may complete and allow the aerial vehicle to continue flight toward a destination after the camera has been adjusted based on the variation. In still other implementations, no adjustment may be performed and, provided the variation is within the tolerance range, operation of the aerial vehicle may be allowed to continue.

Returning to the example described with respect to FIG. 3, if it is determined at decision block 314 that the variation is not within the tolerance range (i.e., the variation is below the tolerance range), the example process completes, as in 318.

Figure 4:
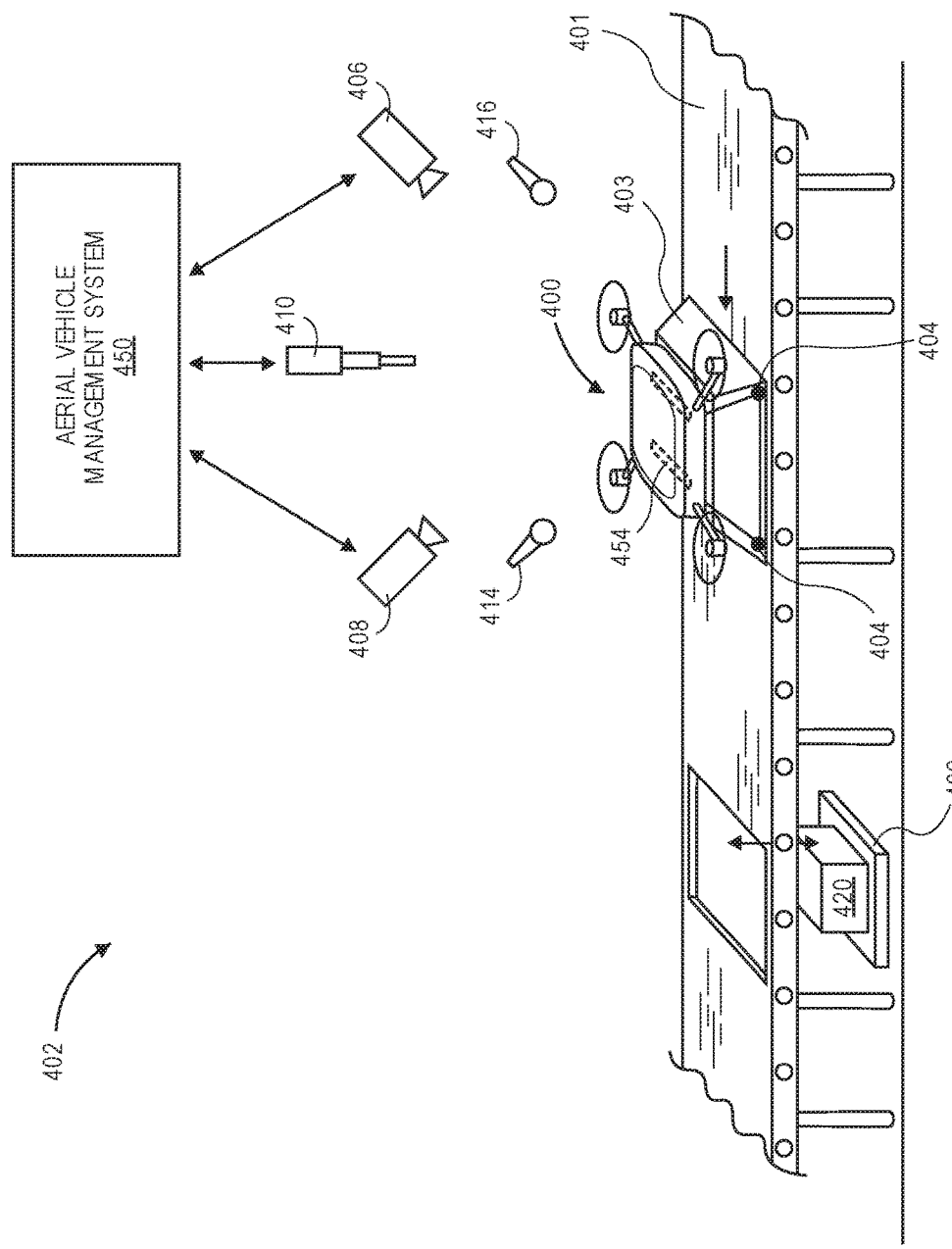
FIG. 4 depicts a pre-flight calibration station, according to an implementation.

FIG. 4 depicts a pre-flight calibration station 402, according to an implementation. The pre-flight calibration station 402 may be used in some implementations to perform verification and validation tests on an aerial vehicle 400 prior to flight of the aerial vehicle. For example, the pre-flight calibration station 402 may be part of a fulfillment process within a materials handling facility. As illustrated in FIG. 4, the aerial vehicle 400 may be secured to a shuttle 403 such that the aerial vehicle 400 is unable to become airborne while secured to the shuttle 403. For example, the aerial vehicle 400 may be secured to the shuttle using one or more straps or other securing mechanisms.

The shuttle 403 may be a stationary location within a materials handling facility where pre-flight testing is performed or, as illustrated in FIG. 4, the shuttle 403 may be used to convey the aerial vehicle 400 along a conveyor 401 to move the aerial vehicle through the materials handling facility as part of a fulfillment process. For example, the shuttle 403 may convey the aerial vehicle 400 along a conveyor 401 from an aerial vehicle storage area to a loading area where a payload 420, such as a customer ordered item, is affixed to the aerial vehicle 400 with the payload engagement mechanism 454. For example, a lift 422 may lift the payload 420 up and into a lower side of the aerial vehicle 400 when the shuttle 403 has positioned the aerial vehicle over the payload 420.

While the aerial vehicle 400 is secured to the shuttle 403, one or more verification and/or validation tests may be performed prior to a flight of the aerial vehicle. For example, the operability of the aerial vehicle may be tested by powering the aerial vehicle and causing one or more of the motors to power up and rotate. Because the aerial vehicle is secured to the shuttle, the force generated by the motor, or the propeller rotated by the motor, will not result in the aerial vehicle becoming airborne. Likewise, power may be provided to the aerial vehicle while the aerial vehicle is secured to the shuttle to charge one or more power modules of the aerial vehicle and/or to provide power to the aerial vehicle while the aerial vehicle is secured to the shuttle.

While the motor is powered and operating, one or more sensors of the pre-flight calibration station 402 may obtain information about the aerial vehicle. Any number and/or type of sensors may be utilized. In the illustrated example, the sensors of the pre-flight calibration station include cameras 406, 408, a laser 410, microphones 414, 416, and pressure sensors 404. In other implementations, other forms of sensors may be used in addition or as an alternative to the illustrated sensors.

In the illustrated example, the cameras may obtain images of the aerial vehicle while secured to the shuttle and provide those images to the aerial vehicle management system 450 for processing. Likewise, the microphones 414, 416 may record sounds generated by operation of the aerial vehicle and provide the recorded sounds to the aerial vehicle management system 450. In still another example, the laser 410 may reflect a light off of a portion of the aerial vehicle 400, measure a movement or an angle of reflection of the laser light off the aerial vehicle as the aerial vehicle is rotating the motor and provide the measured movement or angle of reflection to the aerial vehicle management system 450. In another example, the pressure sensor 404 may measure a force generated by the aerial vehicle as the motor is rotating and provide the measured force to the aerial vehicle management system 450.

The aerial vehicle management system 450 is in communication with and optionally controls the sensors of the pre-flight calibration station 402, and/or controls operation of the shuttle 403. Likewise, the aerial vehicle management system may also communicate with the aerial vehicle 400, providing instructions to the aerial vehicle that are performed by the aerial vehicle while the aerial vehicle is secured to the shuttle 403. The aerial vehicle 400 may also provide information to the aerial vehicle management system as part of the pre-flight testing. For example, the aerial vehicle 400 may provide power consumption information, revolutions per minute ("RPM") measured by the aerial vehicle control system, etc.

As discussed further below with respect to FIG. 6, the aerial vehicle management system, upon receiving the information from the sensors of the pre-flight calibration station and/or upon receiving information from the aerial vehicle 400, may process the received information to verify certain aspects of the aerial vehicle. For example, the aerial vehicle management system 450 may process a series of images received from a camera 408 to determine an actual RPM of the motor and coupled propeller over a period of time. The actual RPM is then compared with the RPM information received from the aerial vehicle (processed information) to confirm that the aerial vehicle control system is properly calibrated with respect to the motor controls. For example, a difference between the actual RPM and the measured RPM may be determined. If the difference is within a tolerance range, the motor or electronic speed control of the motor may be considered to be properly calibrated and approved for flight.

As another example, the aerial vehicle management system 450 may process a series of images and/or the motion or angle of reflection information received from the laser 410 to determine a movement of a portion of the aerial vehicle resulting from the operation of the motor. The determined movement may be analyzed to assess whether a potential mechanical failure is likely. For example, if a motor arm presents a large degree of movement in response to the operation of the motor, it may be determined that a mechanical failure at the joint of the motor arm is potentially going to occur. In such an instance, the flight plans of the aerial vehicle may be aborted and the aerial vehicle routed for manual review to confirm the integrity of the motor arm.

As still another example, the aerial vehicle management system 450 may process the recorded sound to determine a frequency, amplitude, and/or intensity of sound generated by the motor and compare the determined frequency, amplitude, and/or intensity of sound with an expected frequency, amplitude, and/or intensity of sound of the motor. If the recorded frequency, amplitude, and/or intensity varies from the expected frequency, amplitude, and/or intensity beyond a threshold, such a variation may be indicative of a potential motor failure.

In still other implementations, the aerial vehicle management system may process the images received from the cameras of the calibration station 402 to confirm the structural integrity of the aerial vehicle prior to a flight of the aerial vehicle. For example, the images may be processed to determine the structural configuration of the aerial vehicle and the determined structural configuration may be compared with an expected structural configuration of the aerial vehicle. If a difference between the determined structure configuration and the expected structural configuration exists, there is potentially a structural problem with the aerial vehicle and the aerial vehicle may be routed for manual review and correction.

Still further, the aerial vehicle management system 450 may send instructions to the aerial vehicle 400 that cause the aerial vehicle to operate one or more mechanical components (e.g., wings, flaps, motors, inventory engagement mechanisms, lights, etc.) and images of the aerial vehicle obtained as the instructions are executed may be processed to confirm that the mechanical operations included in the instructions are performed by the aerial vehicle as expected.

Figure 5:
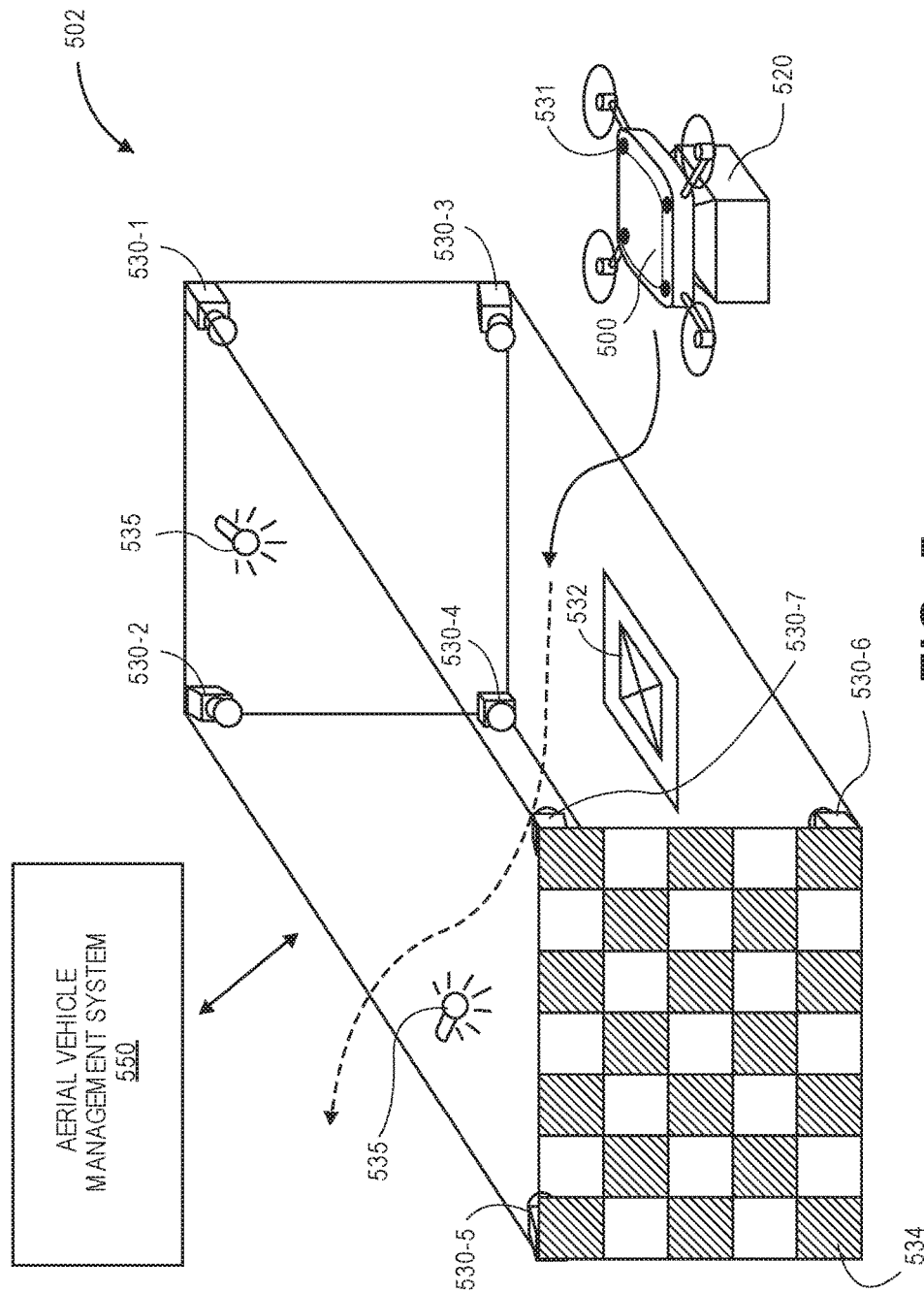
FIG. 5 depicts a sensor calibration channel, according to an implementation.

FIG. 5 depicts a sensor calibration channel 502 that may be used to verify calibration of one or more sensors of an aerial vehicle 500 prior to the aerial vehicle departing a materials handling facility, according to an implementation. The channel may be any defined area within a materials handling facility through which aerial vehicles 500 aerially navigate as part of a departure from the materials handling facility to deliver a payload 520 to a delivery destination, such as a customer specified delivery destination. In some implementations, the channel includes multiple sides between or through which the aerial vehicle navigates. The channel 502 illustrated in FIG. 5 includes four sides that form a tunnel through which the aerial vehicle 500 aerially navigates as it is preparing to depart from a materials handling facility. In other implementations, the channel may have additional or fewer sides.

The channel includes one or more sensors, such as sensors 530-1, 530-2, 530-3, 530-4, 530-5, 530-6, and 530-7, that are configured to obtain information (e.g., images) about the aerial vehicle as the aerial vehicle aerially navigates through the channel. In some implementations, the aerial vehicle 500 may include one or more unique markers 531 that are detectable by the sensors 530. The sensors 530 may detect the position and/or orientation of the unique markers 531, as the aerial vehicle aerially navigates through the channel, and determine a position, pose, heading, orientation, altitude, velocity, speed, etc., of the aerial vehicle. For example, as the markers are determined to move through the channel over a period of time, the altitude, velocity, speed, etc., can be determined. Likewise, if the markers are unique in their arrangement on the aerial vehicle and/or unique in appearance, the position of the markers, as detected by the sensors, can be used to determine the position, pose, heading, orientation, altitude, etc., of the aerial vehicle. In some implementations, the sensors 530 may also or alternatively function as cameras and obtain images of the aerial vehicle as the aerial vehicle aerially navigates through the channel.

Similar to the examples provided above with respect to FIGS. 2 and 4, the sensors 530 may provide the obtained information to the aerial vehicle management system 550 for processing. Likewise, the aerial vehicle 500 may provide sensor information to the aerial vehicle management system 550. The aerial vehicle management system 550 may process the received information to determine variations between the actual information, as determined from the information received from the sensors of the channel 502, and the processed information as determined from the information received from the aerial vehicle.

For example, an altitude variation may be determined based on a comparison of the altitude determined from the channel sensors (actual information) with the altitude information received from the aerial vehicle (processed information). As another example, an RPM variation may be determined based on a comparison of the RPMs determined from a processing of a series of images generated by the channel sensors (actual information) with the RPM information received from the aerial vehicle (processed information). As another example, a position variation may be determined based on a comparison of the position of the aerial vehicle determined from the channel sensors (actual information) with the position information received from the aerial vehicle (processed information). As another example, a pose variation may be determined based on a comparison of the pose determined from the channel sensors (actual information) with the pose information received from the aerial vehicle (processed information). As another example, a heading variation may be determined based on a comparison of the heading of the aerial vehicle determined from the channel sensors (actual information) with the heading information received from the aerial vehicle (processed information). As another example, a velocity variation may be determined based on a comparison of the velocity of the aerial vehicle as determined from the channel sensors (actual information) with the velocity information received from the aerial vehicle (processed information).

Based on the variations, the aerial vehicle may be allowed to continue flight toward a destination or the flight may be aborted so that a full calibration of one or more sensors of the aerial vehicle may be performed.

In some implementations, the channel may include one or more markers, identifiers or other known information that may be imaged by a camera of the aerial vehicle and processed to determine a calibration of the camera. For example, one surface of the channel may include a known pattern 534 and/or a marker 532 and the aerial vehicle may be configured to obtain one or more images of the pattern 534 and/or marker 532 as the aerial vehicle aerially navigates through the channel. The obtained images are then processed and the processed information (e.g., size, shape, color, pattern) representative of the pattern and/or marker in the image is compared with actual information corresponding to the marker to determine a calibration of the camera.

In some implementations, one or more illumination elements 535 may be included in the channel that are used to simulate lighting conditions expected at the delivery destination for the payload 520. In such an example, the illumination elements 535 may be used to simulate the environment at the delivery destination and testing and/or calibration validation of one or more aerial vehicle sensors may be performed in the simulated delivery destination environment. Such simulation may be beneficial to identify potential lighting interference experienced by a camera of the aerial vehicle during delivery of the payload. In other implementations, other environmental conditions may likewise be simulated in the channel. For example, fog, rain, wind, snow, etc., may be generated in the channel and used to simulate an expected environment during delivery of the payload. In some implementations, delivery location environment and structures may also be placed in the channel. For example, if a delivery is planned to occur in a residential backyard, the channel may be configured to include tables, chairs, grass, toys, plants, etc.

Figure 6:
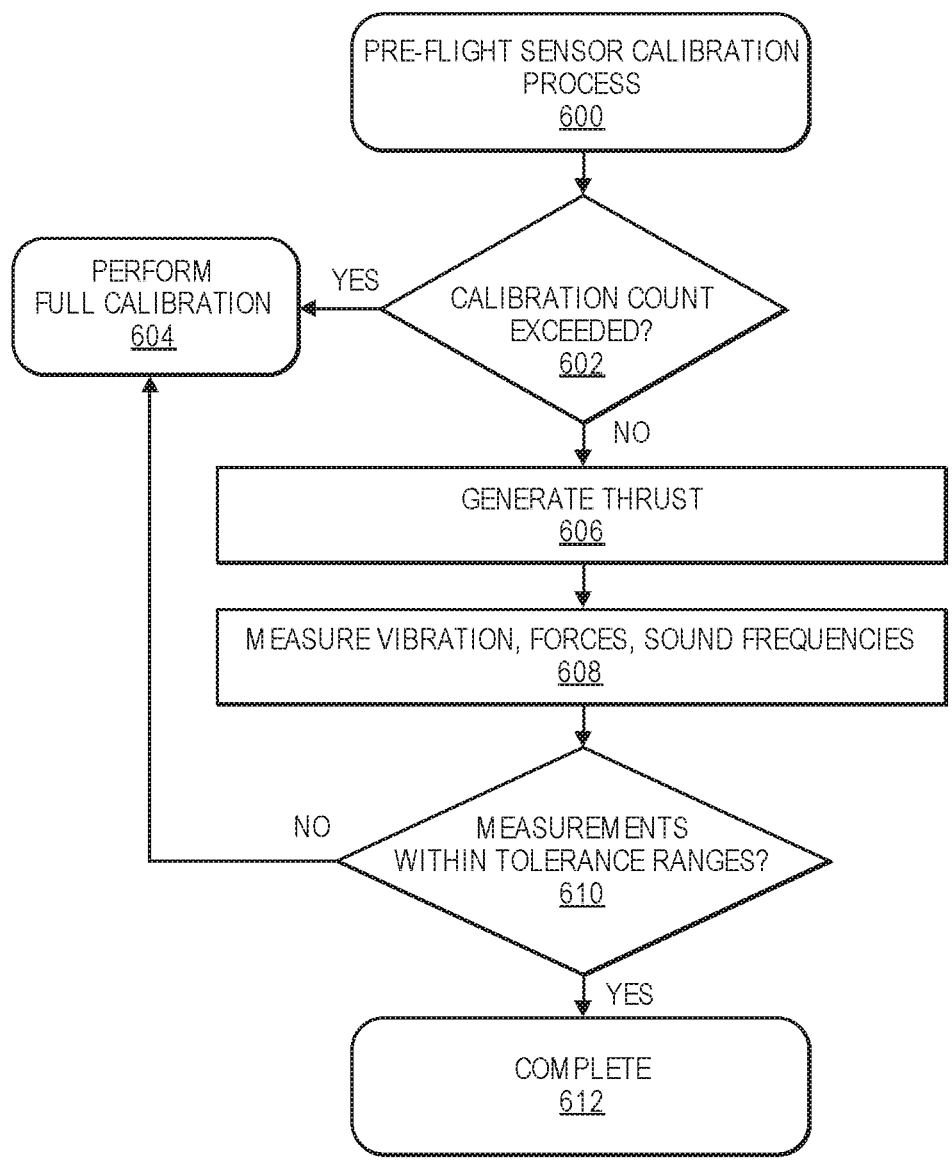
FIG. 6 is a flow diagram illustrating an example pre-flight sensor calibration process, according to an implementation.

FIG. 6 is a flow diagram illustrating a pre-flight sensor calibration process 600, according to an implementation. The example process 600 may be periodically performed for an aerial vehicle, such as a UAV. For example, the example process 600 may be performed each time an aerial vehicle is secured to a shuttle within a materials handling facility and/or routed toward a payload mounting station.

The example process 600 begins by determining if a calibration count has been exceeded for the aerial vehicle, as in 602. A calibration count may be any defined quantity that when exceeded results in a full calibration of the sensors of the aerial vehicle being performed. For example, the calibration count may relate to a number of flights performed by the aerial vehicle since a last full calibration, a number of flight hours of the aerial vehicle since a last calibration, or any other criteria.

If it is determined that the calibration count has been exceeded, instructions are sent that cause the aerial vehicle to be routed to a calibration station for a full calibration of the sensors of the aerial vehicle, as in 604. In some implementations, the instructions may cause the shuttle to route the secured aerial vehicle along a conveyor to a calibration station. In other implementations, the instructions may cause another form of conveyance of the aerial vehicle to a calibration station.

If it is determined that the calibration count has not been exceeded, instructions are sent that cause the aerial vehicle to activate one or more motors of the aerial vehicle and generate a thrust from a propulsion of the motor, as in 606. For example, the motor may rotate a propeller coupled to a shaft of the motor. The rotation of the propeller generates a thrust that attempts to lift the aerial vehicle from the shuttle. However, because the aerial vehicle is secured to the shuttle, it is unable to takeoff from the shuttle. While the thrust is being generated, sensors are utilized to measure or collect information about the aerial vehicle, as in 608. For example, sensors may measure vibration or movement of at least a portion of the aerial vehicle, a pressure sensor may measure a force generated by the thrust of the motor, a microphone may measure a sound generated by the aerial vehicle as the motor is rotating. Other forms of sensors may also collect information about the aerial vehicle. For example, as discussed above with respect to FIG. 5, one or more cameras may capture images of at least a portion of the aerial vehicle while the motor is generating thrust with the propeller.

As discussed above, the information collected by the sensors is processed to determine if the information corresponds with expected information about the aerial vehicle. For example, the vibration or movement information measurements collected from one or more sensors may be compared to vibration or movements that are expected to occur during operation of the aerial vehicle. As another example, a frequency, amplitude, and/or intensity of sound of the motor measured by a sensor may be compared with an expected motor frequency, amplitude, and/or intensity of sound, and a variation determined. In still another example, measured forces generated by the rotation of the motor and propeller may be compared with expected forces that are known for the motor and propeller combination.

A determination may then be made as to whether each of the measurements are within respective tolerance ranges, as in 610. The tolerance range may be any range around an expected output from one or more aspects of the aerial vehicle. For example, based on modeling of the aerial vehicle, it may be determined that a motor arm coupled to the motor that is generating thrust is expected to move or vibrate up to three millimeters (mm). A tolerance range may be a range that is plus or minus from the expected three mm. In other implementations, the tolerance range may be wider or narrower. Likewise, different tolerance ranges may exist for different measurements and/or different components of the aerial vehicle. For example, a tolerance range for a measured frequency, amplitude, and/or intensity variation may be a narrow range around a frequency, amplitude, and/or intensity that is expected to be generated during operation of the motor. As discussed above, a motor that is approaching a failure will produce a different frequency, amplitude, and/or intensity of sound than expected.

If it is determined that the measurements are within the respective tolerance ranges, the example process 600 completes, as in 612, and the shuttle continues to transport the aerial vehicle through the materials handling facility toward a payload engagement station. However, if one or more of the measurements are beyond a respective tolerance range, the aerial vehicle may be routed to a calibration station for full calibration of one or more sensors coupled to the aerial vehicle, as in 604.

Figure 7:
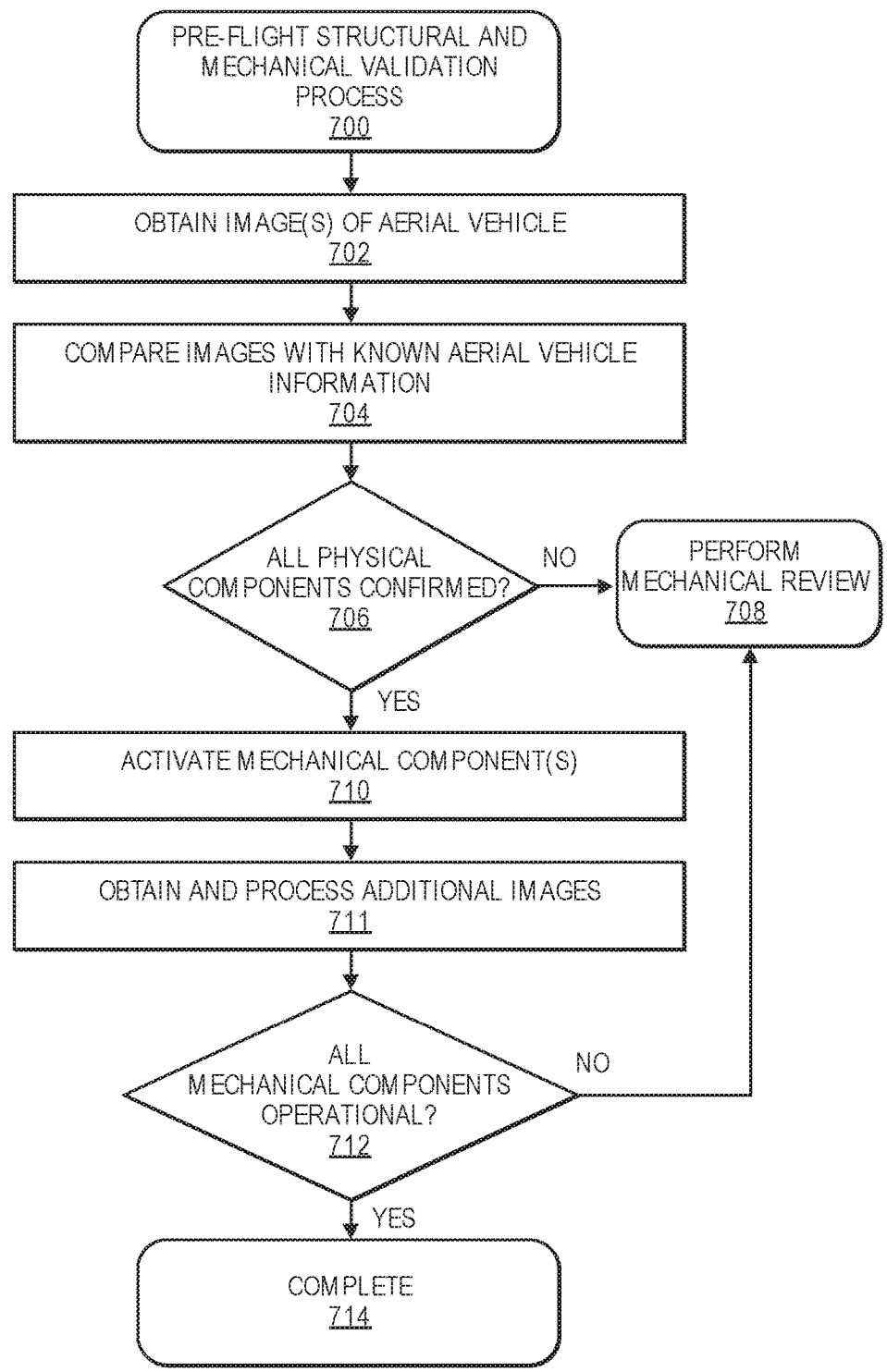
FIG. 7 is a flow diagram illustrating an example pre-flight structural and mechanical validation process, according to an implementation.

FIG. 7 is an example flow diagram illustrating a pre-flight structural and mechanical validation process 700, according to an implementation. Similar to the example process 600 (FIG. 6), the example process 700 may be periodically performed by an aerial vehicle. For example, each time an aerial vehicle is secured to a shuttle, the example process 700 may be performed.

The example process 700 begins by obtaining one or more images of an aerial vehicle while the aerial vehicle is secured to a shuttle, as in 702. The images may be obtained from any perspective around the aerial vehicle. In some implementations, a sufficient number of images may be obtained such that approximately every aspect of the aerial vehicle is represented in at least one of the obtained images.

The obtained images are processed and compared with known aerial vehicle information, as in 704. For example, an image may be processed to determine a structural configuration of a portion of the aerial vehicle represented in the image. The determined structural configuration may be compared with a known or expected structural configuration of the aerial vehicle to confirm that the actual structural configuration, as determined from the images, corresponds to the expected structural configuration of the aerial vehicle. In some implementations, all physical components of the aerial vehicle, such as wings, frame, motor arms, screws, wires, propellers, motors, etc., may be determined from the images and compared with corresponding expected structural components for the aerial vehicle.

A determination is then made as to whether all compared physical components that were determined in the images are confirmed to correspond to the expected physical components of the aerial vehicle, as in 706. If it is determined that one or more of the determined physical components of the aerial vehicle do not correspond to the expected physical components, the aerial vehicle may be routed for a mechanical review, as in 708. A mechanical review may include a human agent, and/or robotic unit to further analyze the portion of the aerial vehicle determined to not correspond to the expected physical component.

If it is determined that all physical components are confirmed to correspond to the expected physical components of the aerial vehicle, the example process may send instructions to the aerial vehicle that cause the aerial vehicle to activate one or more mechanical components of the aerial vehicle, as in 710. For example, the instructions may cause the aerial vehicle to mechanically operate different components of the aerial vehicle, including, but not limited to, ailerons, flaps, rudders, motors, cameras, lights, speakers, inventory engagement mechanism, etc.

As the mechanical components are activated, additional images and/or other sensor information is collected and processed, as in 711. For example, images that include representations of the mechanical components in operation may be processed to determine if the mechanical components are operating as expected. For example, one or more image processing algorithms may be utilized to confirm expected movements or other functions performed by mechanical components as they are activated by the aerial vehicle.

A determination is then made as to whether all mechanical components are operational, as in 712. If it is determined that one or more of the mechanical components are not operational, the example process returns to block 708 and the aerial vehicle is routed for a mechanical review. However, if it is determined that all mechanical components of the aerial vehicle are operational, the example process 700 completes, as in 714, and the shuttle continues to transport the aerial vehicle toward a payload engagement station.

Figure 8:
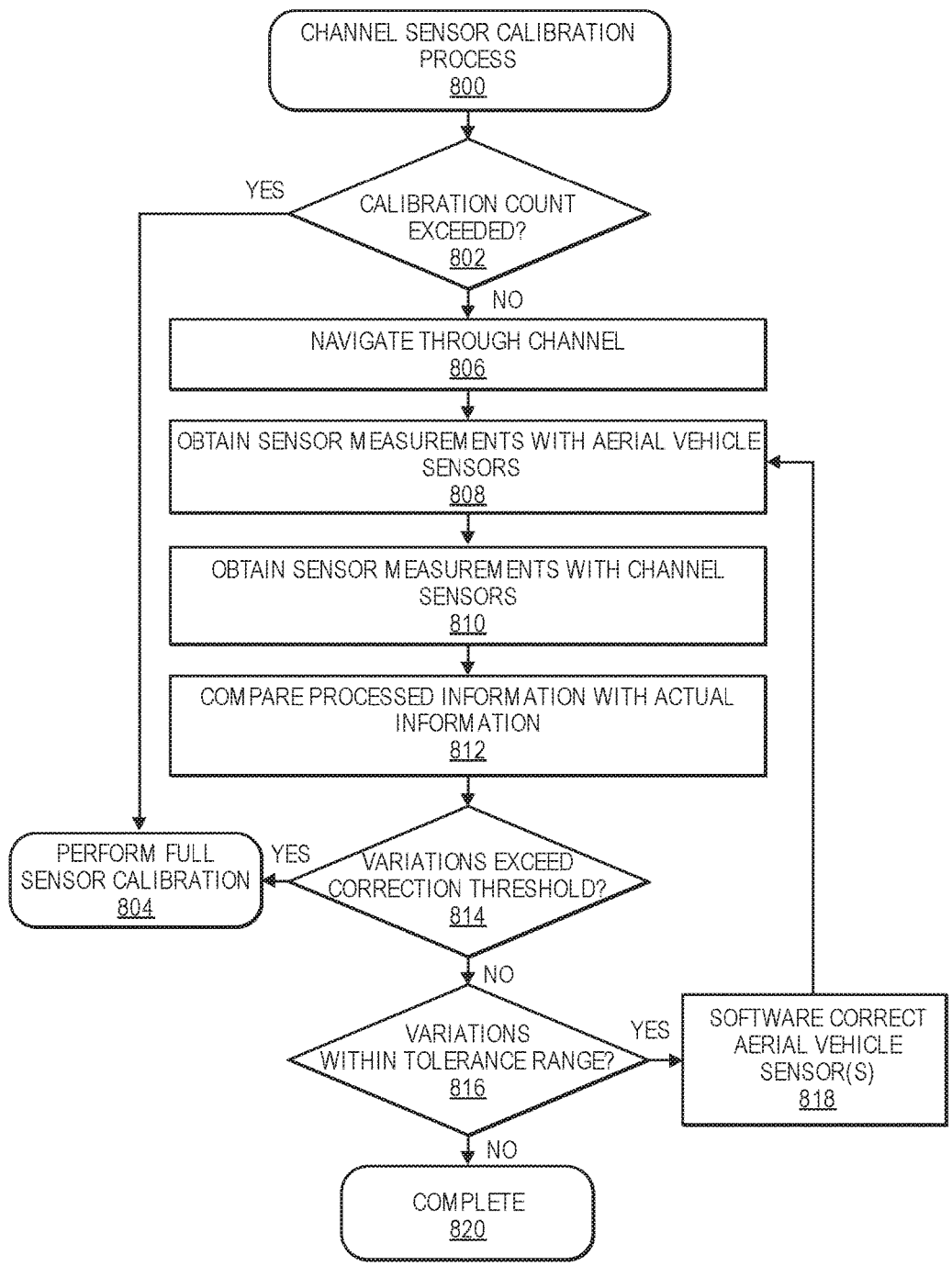
FIG. 8 is a flow diagram illustrating an example channel sensor calibration process, according to an implementation.

FIG. 8 is a flow diagram illustrating an example channel sensor calibration process 800, according to an implementation. The example process may be performed periodically for an aerial vehicle. For example, the example process 800 may be performed each time an aerial vehicle aerially navigates through a channel as it is departing a materials handling facility.

Similar to the example processes 300 (FIG. 3) and 600 (FIG. 6), a determination is made as to whether a calibration count has been exceeded, as in 802. As discussed above, a calibration count may be any defined quantity that when exceeded results in a full calibration of the sensors of the aerial vehicle. For example, the calibration count may relate to a number of flights performed by the aerial vehicle since a last full calibration, a number of times the aerial vehicle has aerially navigated through the channel since a full calibration, a number of flight hours of the aerial vehicle since a last calibration, or any other criteria. If it is determined that the calibration count exceeds a threshold, instructions may be sent that cause the aerial vehicle to abort a flight plan and be routed to a calibration station for a full sensor calibration, as in 804.

If the calibration count is not exceeded, instructions are sent that cause the aerial vehicle to navigate through the channel, as in 806. As discussed above with respect to FIG. 5, the channel may be any defined area within a materials handling facility through which aerial vehicles aerially navigate as part of a departure from the materials handling facility to deliver a payload to a delivery destination, such as a customer specified delivery destination. In some implementations, the channel includes multiple sides between or through which the aerial vehicle navigates. For example, the channel may include four sides, as illustrated in FIG. 5, three sides, two sides, one side, etc.

As the aerial vehicle aerially navigates through the channel, sensor measurements are obtained with sensors of the aerial vehicle, as in 808. In some implementations, all sensors of the aerial vehicle may obtain measurements as the aerial vehicle navigates through the channel. Sensors may include, but are not limited to, cameras, depth sensors, altimeters, barometers, magnetic sensors, gyroscopes, navigation sensors (e.g., Global Positioning System (GPS), indoor positioning system sensors, pitot sensors, motor speed sensors, power sensors, wireless networking sensors, etc. As will be appreciated, the measurements from the sensors of the aerial vehicle may be used to determine a variety of information about the aerial vehicle. For example, the sensor information may be used to determine an orientation, pose, heading, pitch, yaw, roll, acceleration, velocity, speed, altitude, RPM of motors, etc., that are occurring and as perceived by the aerial vehicle as the aerial vehicle navigates through the channel. Information about the aerial vehicle and aerial vehicle sensor collected measurements are referred to herein as processed information. Reference to processed information is intended to include one or more of the aerial vehicle collected sensor measurements and/or aerial vehicle information determined from the aerial vehicle collected sensor measurements.

In addition to obtaining sensor measurements from sensors of the aerial vehicle, sensor measurements obtained using sensors positioned within the channel may be collected as the aerial vehicle aerially navigates through the channel, as in 810. As discussed above, any variety of sensors may be positioned within the channel and configured to obtain measurements relating to the aerial vehicle as the aerial vehicle aerially navigates through the channel. Sensors within the channel may include cameras, thermal sensors, x-ray sensors, positioning sensors, distance determining elements, including LIDAR sensors, SONAR sensors, time-of-flight sensors, microphones, etc. Similar to the sensor measurements collected by the aerial vehicle sensors, sensor measurements collected by the channel sensors may be used to determine a variety of actual information about the vehicle. For example, sensor measurements collected by channel sensors may be used to determine an actual orientation, an actual pose, an actual heading, an actual pitch, an actual yaw, an actual roll, an actual acceleration, an actual velocity, an actual speed, an actual altitude, actual RPM of motors, etc., that are occurring as the aerial vehicle navigates through the channel. Measurements about the UAV that are collected by channel sensors and/or information determined from measurements collected by channel sensors are referred to herein as actual information. Reference to actual information is intended to include one or more of the channel collected sensor measurements and/or UAV information determined from the channel collected sensor measurements.

One or more of the processed information are then compared with a respective one or more of the actual information to determine a variation or difference between the two measurements, as in 812. For example, an altitude of the aerial vehicle as measured by an aerial vehicle sensor (processed information) may be compared to an actual altitude of the aerial vehicle as determined by a distance determining element sensor of the channel. As another example, the pose of the aerial vehicle as perceived by the aerial vehicle (processed information) may be compared to an actual pose determined from the channel sensors (actual information). For example, the channel sensors may determine the pose of the aerial vehicle based on images of the aerial vehicle or position information obtained from position tracking sensors.

A determination is then made as to whether one or more of the variations resulting from the comparisons of the processed information and the actual information exceeds a correction threshold, as in 814. A correction threshold may be any defined amount of variation that is an upper limit that is allowable for continued operation of the aerial vehicle without a full calibration of the aerial vehicle sensors. The correction threshold may vary for different aerial vehicles, different times of day, different days of year, different destinations, etc. In one implementation, the correction threshold may be exceeded if the variation between the processed information and the actual information is more than eight percent.

If it is determined that the variation exceeds the correction threshold, instructions are sent that cause the aerial vehicle to terminate a flight and be routed to a calibration station for a full sensor calibration, as in 804. If it is determined that the correction threshold has not been exceeded, a determination is made as to whether one or more of the variations are within a tolerance range, as in 816. The tolerance ranges may be any ranges of variations for different sensors that are below the correction threshold. For example, a tolerance range may be any variation between two percent and eight percent of variation. In other implementations, the tolerance range may be any variation below the correction threshold. A lower limit may be beneficial as some variation between the processed information and actual information may be expected due to environmental conditions and/or other factors acting upon the aerial vehicle and/or the sensors of the aerial vehicle.

If it is determined that the variations are within respective tolerance ranges, instructions are sent that result in an adjustment, or software correction of the one or more variations that are within the tolerance ranges, as in 818. For example, adjustment instructions may be sent that cause the aerial vehicle to adjust image information based on a difference determined as the variation. As another example, adjustment instructions may be sent that cause the aerial vehicle to adjust a heading information based on a difference determined between a perceived heading determined from the aerial vehicle sensors (processed information) and an actual heading, as determined from the channel sensors (actual information).

Upon providing instructions to adjust or software correct the sensor calibration(s), the example process returns to block 808 and continues. In some implementations, rather than returning to block 808 and continuing, the example process may complete and allow the aerial vehicle to continue flight toward a destination after the one or more sensors have been adjusted based on the variation. In still other implementations, no adjustment may be performed and, when the variation is within the tolerance range, operation of the aerial vehicle may be allowed to continue.

Returning to the example process described with respect to FIG. 8, if it is determined at decision block 816 that the variation is not within the tolerance range (i.e., the variation is below the tolerance range), the example process completes, as in 820.

Figure 9:
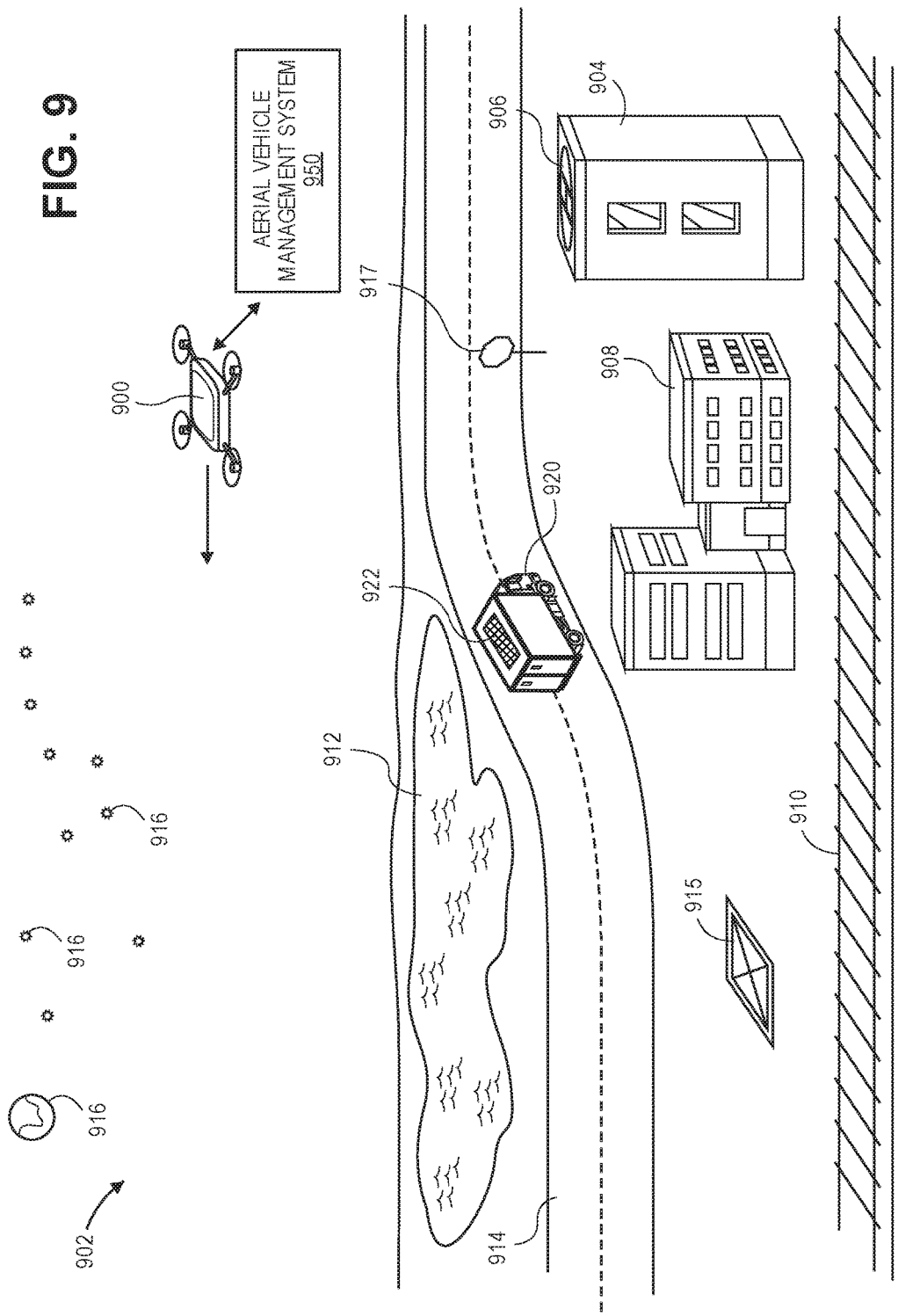
FIG. 9 depicts an environment with identifiers with which an unmanned aerial vehicle may perform sensor calibration validation, according to an implementation.

FIG. 9 depicts an environment 902 having identifiers with which an aerial vehicle 900 may perform sensor calibration validation during flight, according to an implementation. As discussed herein, an aerial vehicle may aerially navigate through an environment, following a flight path or flight plan, to a delivery destination. For example, the aerial vehicle may aerially navigate between a materials handling facility and a customer specified delivery destination at which the aerial vehicle will deliver an item ordered by the customer.

As the aerial vehicle 900 navigates through the environment 902, the aerial vehicle may periodically obtain information about the environment that is used to verify calibration of one or more sensors of the aerial vehicle. Information about certain objects within the environment may be known that can be used as reference points for sensor calibration validation. For example, position information (e.g. GPS coordinates), size, color, height, etc., of buildings 908, 904 may be known and stored, for example, in a memory of the aerial vehicle, stored in a data store of the aerial vehicle management system 950, etc. Likewise, some buildings, such as building 904, may include identifying markers 906 that are of a known size, shape, color, position, etc.

In the example of the buildings 904, 908, as the aerial vehicle navigates past the buildings, sensor information (e.g., images, distance, etc.) corresponding to the buildings may be obtained by one or more sensors of the aerial vehicle 900. For example, a camera of the aerial vehicle 900 may obtain images that include representations of the buildings. As another example, a distance determining element may determine a distance between the buildings and the aerial vehicle.

The sensor information may then be processed and compared with actual information about the buildings to determine a variation between the processed information and the actual information about the buildings. For example, the images may be processed to determine size, shape, color, patterns etc., of the buildings represented in the images (processed information). That processed information may be compared to actual information about the building to determine a variation or difference between the processed information and the actual information about the building. As another example, the distance between the building, as measured by the distance determining element of the aerial vehicle, and the actual height of the building may be summed and compared to an altitude as measured by an altimeter of the aerial vehicle to determine any variation between the two measurements.

As will be appreciated, any object within the environment for which actual information is available to the aerial vehicle and/or the aerial vehicle management system 950 may be used to confirm one or more aerial vehicle sensor measurements. For example, the actual information (e.g., location, size, shape, color, etc.) about roadways 914, signs 917, railroad tracks 910, bodies of water 912, graphical representations, projected patterns, etc., may be stored in a memory of the aerial vehicle and/or stored in a memory of the aerial vehicle control system. As the aerial vehicle is navigating through the environment, the aerial vehicle may obtain sensor measurements relating to one or more of the objects within the environment and that information may be compared to actual information relating to the object to verify a calibration of one or more sensors.

In some implementations, images of one or more celestial bodies 916 (e.g., stars, moons, planets) may be obtained and the known position of those celestial bodies may be compared to positions of those celestial bodies as represented in the images. Such a comparison may be used to verify a calibration of the aerial vehicle camera and/or positioning information measured by a GPS of the aerial vehicle.

Likewise, in some examples, the aerial vehicle may know or be provided with position information relating to a ground based transportation unit 920 and the ground based transportation unit may include a unique marker 922 that is visible to the aerial vehicle 900. Using such information, the aerial vehicle may obtain images that include representations of the marker 922 and process those images to verify a calibration of the cameras. Specifically, the representation of the marker may be compared with known information about the marker to verify the calibration of the aerial vehicle cameras. In a similar manner, one or more markers 915 may be placed at known positions within the environment and the aerial vehicle may obtain images of the marker 915 when the marker is within a field of view of a camera of the aerial vehicle 900. The images of the marker may be processed and compared to known marker information to verify a calibration of the cameras of the aerial vehicle.

Figure 10:
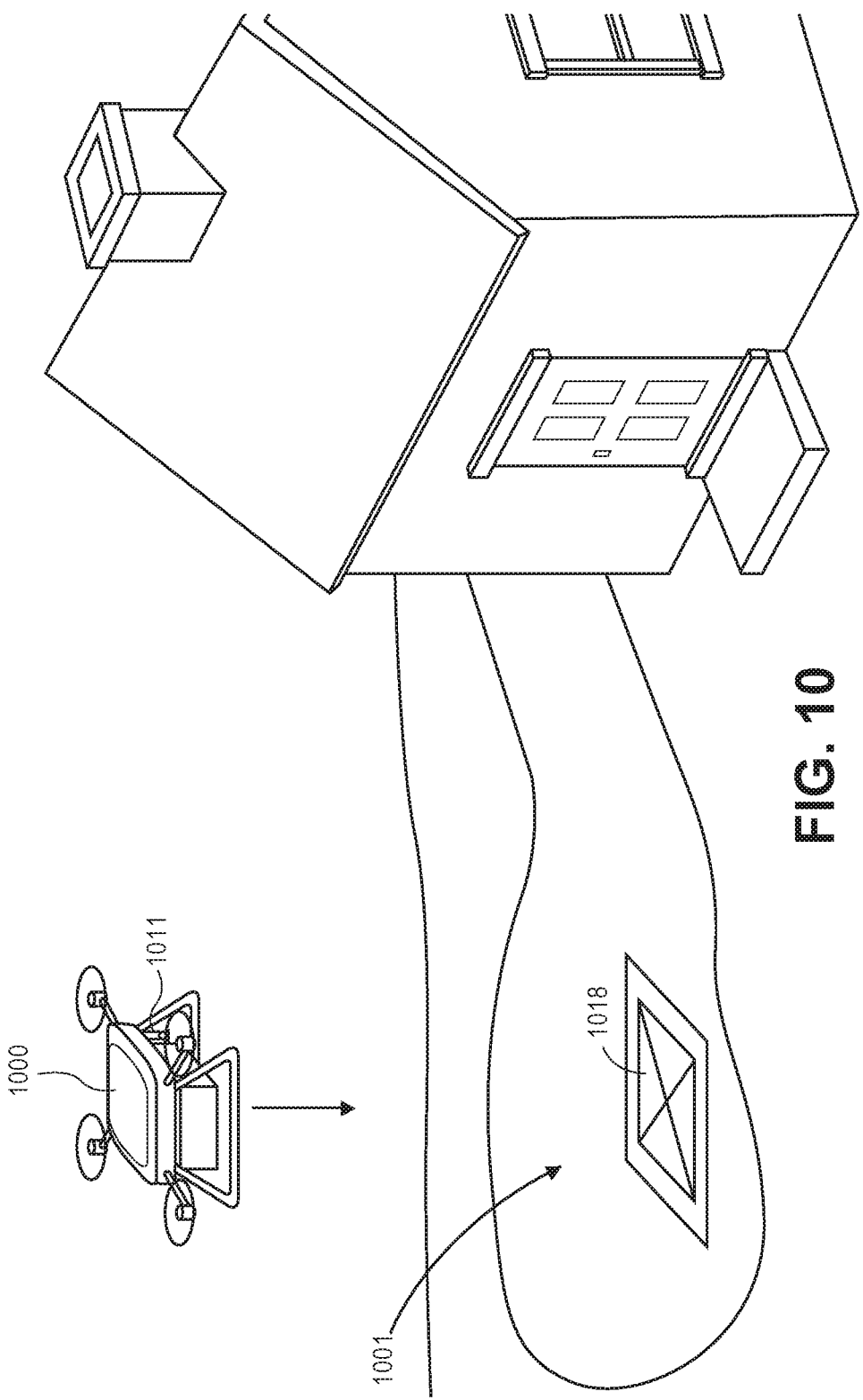
FIG. 10 depicts a delivery destination prior to a delivery of an item by an unmanned aerial vehicle, according to an implementation.

In some implementations, sensor calibration validation may be confirmed as part of a descent toward a delivery destination. For example, FIG. 10 depicts a delivery destination 1001 prior to a delivery of an item by an aerial vehicle 1000, according to an implementation. As the aerial vehicle descends toward the delivery destination, one or more cameras 1011 may obtain images of a marker 1018 positioned at the delivery destination. The marker may be of a known size, shape, color, and/or include a known pattern. For example, the marker may be provided to a customer by an electronic commerce retailer for placement at the delivery destination to aid in identification of the delivery destination and delivery of a payload.

The images of the marker 1018 obtained by cameras of the aerial vehicle may be processed to determine a size, shape, color, position, orientation, pattern, etc., of the marker as represented in the image and that processed information may be compared with actual information about the marker to verify that the camera is properly calibrated. If the camera is not properly calibrated, the delivery of the payload that contains the customer ordered item(s) may be aborted. If the camera is properly calibrated, descent of the aerial vehicle may continue and the payload delivered to the delivery destination.

Figure 11:
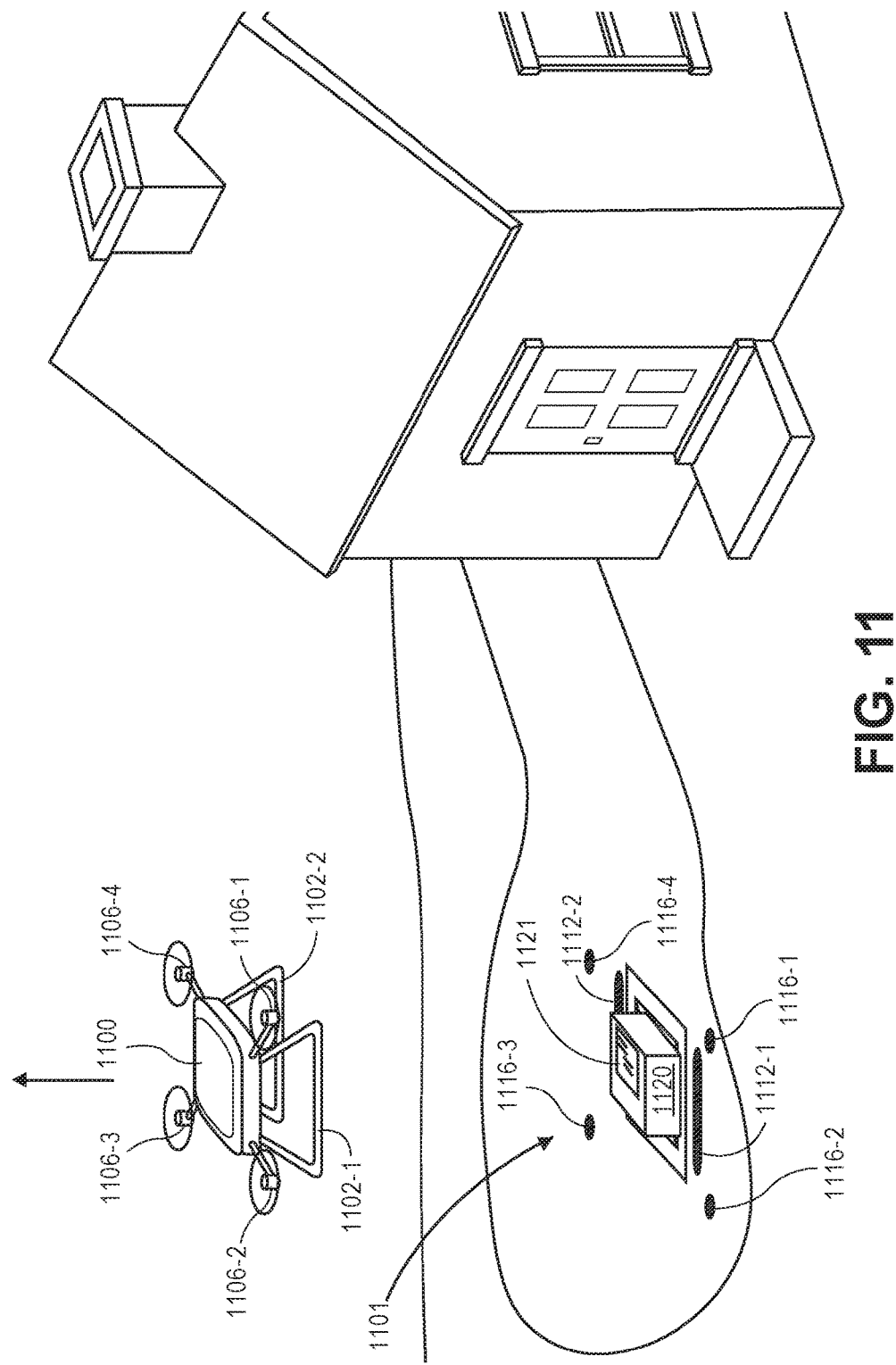
FIG. 11 depicts a delivery destination subsequent to a delivery of an item by an unmanned aerial vehicle, according to an implementation.

Sensor validation and/or health verification may also be performed as the aerial vehicle departs the delivery destination following a delivery of a payload. For example, FIG. 11 depicts a delivery destination 1101 subsequent to a delivery of a payload 1120 by an aerial vehicle 1100, according to an implementation. For example, as the aerial vehicle descends toward the delivery destination, the aerial vehicle may heat one or more landing gears 1102-1, 1102-2 so that when the aerial vehicle lands at the delivery destination 1101 at least a portion of the heat from the landing gears 1102-1, 1102-2 is transferred to and warms the surface upon which the aerial vehicle lands as part of the payload 1120 delivery. Likewise, heat generated from the motors 1106-1, 1106-2, 1106-3, 1106-4 may likewise transfer to the surface and heat at least a portion of the surface. The heated landing gear and the heat from the motors leave heat signatures 1112-1, 1112-2, 1116-1, 1116-2, 1116-3, and 1116-4. Each of the heat signatures 1112-1, 1112-2, 1116-1, 1116-2, 1116-3, and 1116-4 are of a known size, shape, intensity, orientation, position, etc. relative to the other heat signatures generated while the aerial vehicle is landed at the delivery destination. Based on this known information, a calibration of an aerial vehicle sensor, such as a thermal imaging or infrared camera, may be verified and/or adjusted. For example, a thermal imaging camera may obtain images that include a representation of the heat signatures. The thermal images may be processed to generate processed information that provide an indication of the size, shape, pattern, position, orientation, intensity, etc. of the heat signatures as represented in the obtained image. That processed information may be compared with actual information about the heat signatures to determine a variation between the processed information and the actual information. As discussed herein, if the variation exceeds a correction threshold, the aerial vehicle may be routed for full sensor calibration. If the variation is within a tolerance range, the sensor may be adjusted (e.g., software adjusted) and operation of the aerial vehicle may continue.

In addition to confirming sensor calibration, the heat signatures may also be used to confirm operability of the motors. For example, if the aerial vehicle includes four motors, each motor will generate a heat signature 1116-1, 1116-2, 1116-3, and 1116-4 at known locations at the delivery destination while the aerial vehicle is landed at the delivery destination. However, if one of the motors is not operating it may not generate a heat signature. When the aerial vehicle departs and generates processed information and compares the processed information with actual information, the determined variation may also provide a confirmation that all motor heat signatures were detected in the processed information. If one of the motor heat signatures is not detected, it can be determined that the motor is not operating properly. In some implementations, an intensity of the motor heat signatures represented in the processed information may be compared with an actual motor heat signature intensity expected for the motors of the aerial vehicle. If the intensity of the processed information does not correspond with the actual information, such variation may indicate that the motor is experiencing mechanical problems. If a motor is determined to be non-operational and/or experiencing mechanical problems, flight of the aerial vehicle may be aborted.

As another example, as the aerial vehicle 1100 ascends from the delivery destination, one or more images may be obtained that include a representation of the delivered payload 1120. As illustrated, the delivered payload 1120 may include a unique identifier, marker or shipping label 1121 that is oriented toward the aerial vehicle as the aerial vehicle is ascending. The delivered payload 1120 and/or the label 1121 or marker may have a known size, shape, color, position, orientation, pattern, etc. As the aerial vehicle ascends, the aerial vehicle may obtain one or more images that include a representation of the payload 1120 and/or the label 1121 included on the payload. Those images may be processed to determine a size, shape, color, position, orientation, pattern, etc., of the payload and/or the label included on the payload as represented in the image, and that processed information may be compared with the actual information about the payload and/or label included on the payload to determine a variation, as discussed herein.

Figure 12:
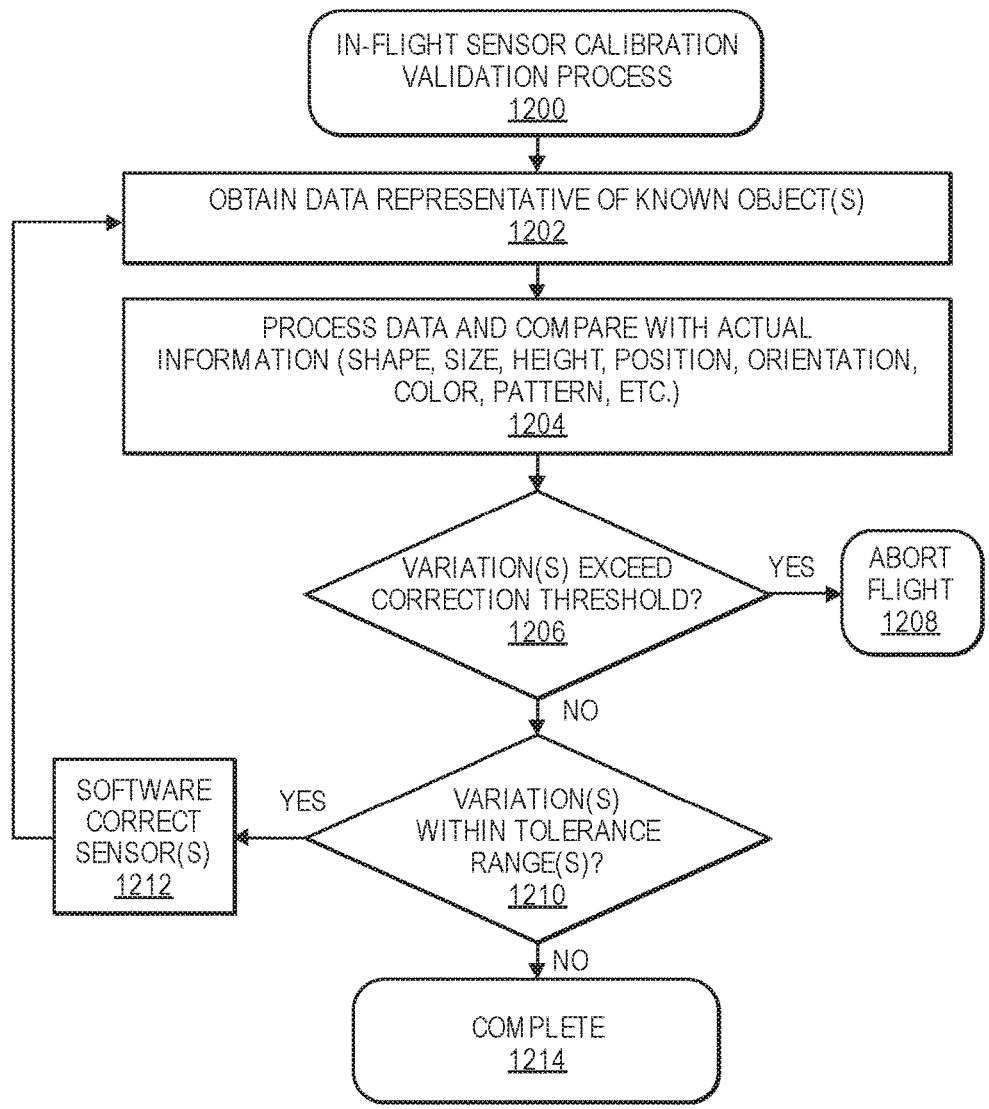
FIG. 12 is a flow diagram illustrating an in-flight sensor calibration validation process, according to an implementation.

FIG. 12 is a flow diagram illustrating an example in-flight sensor calibration validation process 1200, according to an implementation. The example process 1200 begins by obtaining with a sensor coupled to the aerial vehicle, data representative of a known object within an environment, as in 1202. A known object may be any object for which information about the object is known to the aerial vehicle and/or an aerial vehicle management system. Information about a known object may include, but is not limited to, a size of the object, a color of the object, a position of the object, an orientation of the object, a height of the object, a shape of the object, a pattern on the object, etc. The obtained data is then processed to determine information about the object as represented in the data and that processed information is compared with the known information about the object, as in 1204. For example, a size, shape, height, position, orientation, color, pattern, etc., of the object as represented in the data may be determined from a processing of the data. The processed information about the object, as determined from a processing of the data, is then compared to actual information about the object to determine a variation between the processed information about the object and the actual information about the object.

A determination is then made as to whether the variation exceeds a correction threshold, as in 1206. As discussed above, a correction threshold may be any defined amount of variation that is an upper limit that is allowable for continued operation of the aerial vehicle without a full calibration of the camera. The correction threshold may vary for different aerial vehicles, different times of day, different days of year, different destinations, etc. In one implementation, the calibration threshold may be exceeded if the variation between the processed information about the object and the actual information about the object is more than eight percent.

If it is determined that the variation exceeds the correction threshold, instructions are sent that cause the aerial vehicle to terminate a flight and be routed to a calibration station for a full camera calibration, as in 1208. If it is determined that the correction threshold has not been exceeded, a determination is made as to whether the variation(s) is within a tolerance range, as in 1210. The tolerance range may be any range of variation below the correction threshold. For example, the tolerance range may be any variation between two percent and eight percent of variation. In other implementations, the tolerance range may be any variation below the correction threshold. A lower limit may be beneficial as some variation between the processed information and actual information may be expected due to environmental conditions and/or other factors impacting the image creation by the camera.

If it is determined that the variation is within a tolerance range, instructions are sent that result in an adjustment, or software correction of the variation, as in 1212. For example, adjustment instructions may be sent that cause the aerial vehicle to adjust image information based on a difference determined as the variation. Upon providing instructions to adjust or software correct the calibration, the example process returns to block 1202 and continues. In some implementations, rather than returning to block 1202 and continuing, the example process 1200 may complete and allow the aerial vehicle to continue flight toward a destination after the sensor has been adjusted. In still other implementations, no adjustment may be performed and, provided the variation is within the tolerance range, operation of the aerial vehicle may be allowed to continue.

Returning to the example described with respect to FIG. 12, if it is determined at decision block 1210 that the variation is not within the tolerance range (i.e., the variation is below the tolerance range), the example process completes, as in 1214.

Figure 13:
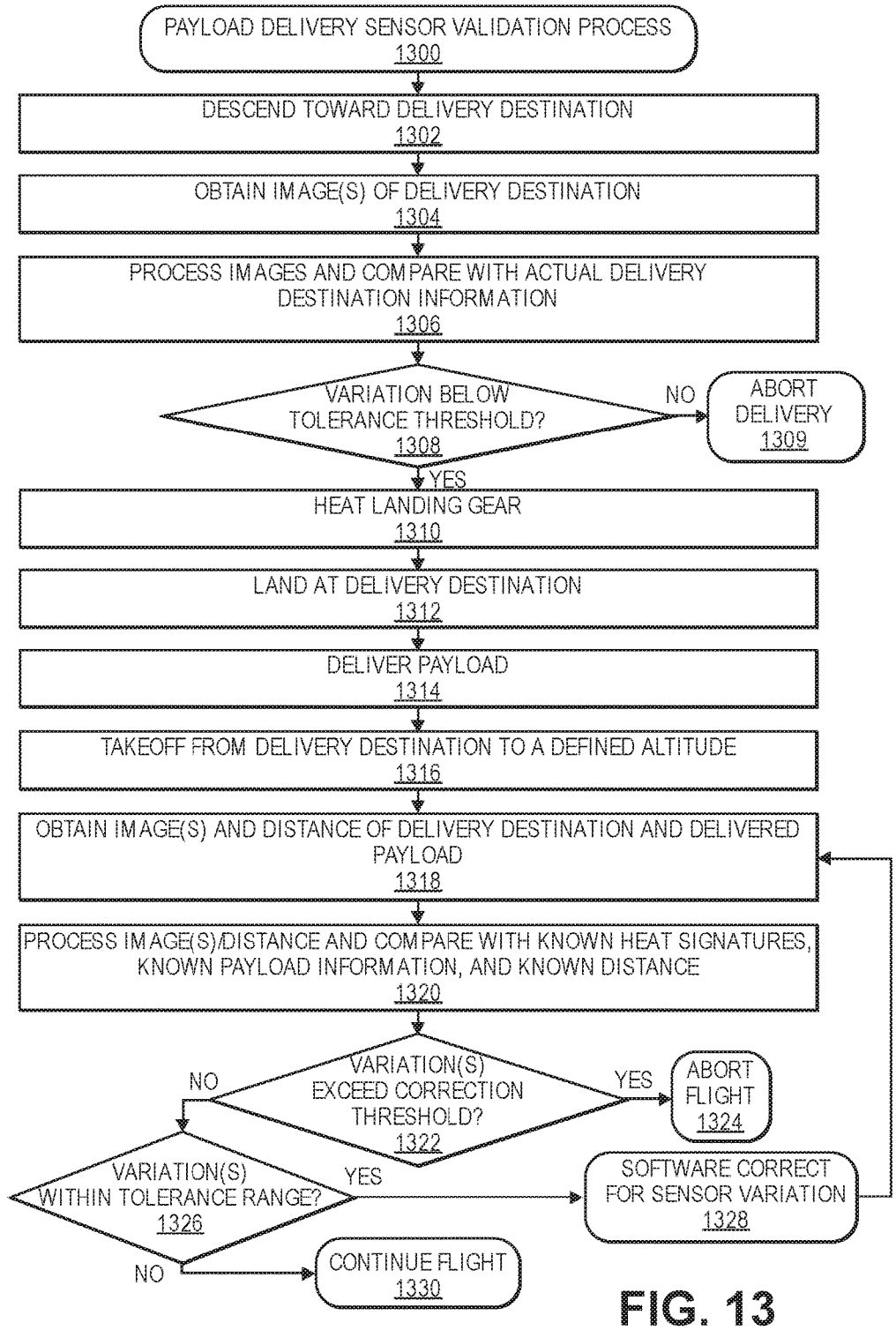
FIG. 13 is a flow diagram illustrating a payload delivery sensor calibration validation process, according to an implementation.

FIG. 13 is a flow diagram illustrating an example payload delivery sensor calibration validation process 1300, according to an implementation. The example process 1300 may be performed each time an aerial vehicle is approaching a delivery destination or otherwise descending and/or departing a delivery destination. The example process 1300 begins as the aerial vehicle descends toward a delivery destination, as in 1302. As the aerial vehicle descends, data representative of the delivery destination is obtained, as in 1304. For example, one or more images may be obtained using cameras of the aerial vehicle and those images may be processed to determine information about the delivery destination, as in 1306. For example, a marker or other object of a known size, shape, color, position, orientation, pattern, etc., may be positioned at the delivery destination and the aerial vehicle may obtain data representative of the marker or other object. The obtained data may be processed to determine a size, shape, color, position, orientation, pattern, etc., of the marker as represented in the data, referred to herein as processed information. The processed information determined from the data may then be compared with the actual information about the marker or other object that is positioned at the delivery destination to determine a variation between the processed information determined from the data and the actual information about the marker or other object, as in 1306.

A determination is then made as to whether the variation is below a tolerance threshold, as in 1308. The tolerance threshold may be any amount of variation above which it may not be safe to continue a descent toward a delivery destination. The tolerance threshold may vary based on a variety of factors. For example, if the delivery destination is in a remote area that is not often or easily accessible to animals (e.g., humans, dogs, cats), a first tolerance range may be utilized. If the delivery destination is in an area where humans and/or other animals may be present, such as a yard near a personal residence, a second, lower tolerance range may be utilized. Likewise, different tolerance ranges may be used for different locations, different times of day, different environmental conditions, etc.

If it is determined that the variation between the processed information and the actual information exceeds the tolerance range, descent toward the delivery destination is terminated and, thus, delivery is aborted, as in 1309. Delivery may be aborted to avoid any potential incidence between the aerial vehicle and another object at the delivery destination.

If it is determined that the variation is below the tolerance threshold, the landing gear of the aerial vehicle may be heated, as in 1310. For example, the landing gear may be formed of a conductive material (e.g., metal) that can be heated by the aerial vehicle. In another example, the landing gear may include a heating element that can be activated to heat the landing gear.

As the landing gear is heated, the aerial vehicle may continue to descend toward and eventually land at the delivery destination, as in 1312, and deliver the payload to the delivery destination, as in 1314. For example, the aerial vehicle may land at the delivery destination and disengage the payload engagement mechanism, thereby releasing the payload from the aerial vehicle. As discussed above, the payload may include an item ordered by a customer for delivery by an aerial vehicle.

Once the payload has been released and delivery completed, the aerial vehicle may takeoff from the delivery destination and ascend to a defined altitude, as in 1316. The defined altitude may be any defined altitude above the delivery destination. For example, the defined altitude may be approximately 2.5 meters. In other implementations, the defined altitude may be higher or lower.

From the defined altitude, the aerial vehicle may obtain images, distance measurements and/or other data representative of the delivery destination and the delivered payload, as in 1318. The images may include digital still images (e.g., RGB images, greyscale or black and white images), and/or thermographic images. The distance information may be obtained using a distance determining element, such as a time of flight sensor, SONAR, LIDAR, or any other sensor that can be used to determine a distance between the sensor and another object.

The obtained images, distance information, and/or other data may then be processed and compared with known information about the delivery destination, the delivered payload, heat signatures left at the delivery destination from the landing gears and/or motors and the altitude of the aerial vehicle to determine a variation between the processed information determined from the images, the distance measurements, and/or other data and actual information about the delivery destination, the payload, and/or the heat signatures, as in 1320. For example, a size, shape, color, pattern, etc., of the payload, as determined from a processing of the images and/or other data that is representative of the payload, may be compared with an actual size, shape, color, pattern, of the payload. As another example, a size, shape, position, orientation, pattern, intensity, etc., of the heat signatures left by the landing gear and/or the motors may be compared with known information about the expected size, shape, position, orientation, pattern, intensity, etc., of the heat signatures to determine a variation between the information determined from a processing of the data (e.g., a thermographic image) and actual information known for the heat signatures of the aerial vehicle.

In some implementations, the variation between the heat signatures at the delivery destination and the expected heat signatures may provide a confirmation as to whether all motors of the aerial vehicle are operating properly. For example, if the aerial vehicle includes eight motors it should generate a heat signature pattern at the delivery destination that includes a heat signature from each of the eight of the motors. Likewise, each of those motors should generate an intensity of the heat signature within an expected intensity range. When the heat signature (e.g., pattern of motor heat signatures and/or intensity of motor heat signatures) generated at the delivery destination is compared with the expected heat signatures it can be confirmed whether all motors are operating and/or whether one or more of the motors is not operating as expected. For example, if one of the heat signatures of an expected heat signature pattern is missing, the variation between the detected heat signatures and the expected heat signatures provides an indication that one of the motors is not operating. Likewise, if one of the motor heat signatures detected at the delivery destination has an intensity that is not within an expected intensity range, it may be determined that the motor generating that heat signature is not operating as expected. If a motor is determined to be non-operational and/or not operating as expected, continued flight of the aerial vehicle may be aborted.

Returning to FIG. 13, a determination is made as to whether any of the variations exceed a respective correction threshold, as in 1322. A correction threshold may be any defined amount of variation that is an upper limit that is allowable for continued operation of the aerial vehicle without a full calibration of the respective sensor. The correction thresholds may vary for different aerial vehicles, different sensors of the same or different aerial vehicles, different times of day, different days of year, different destinations, etc. In one implementation, the calibration thresholds may be exceeded if the variation between the processed information and the actual information is more than eight percent.

If it is determined that one or more variations exceed the respective correction threshold, instructions are sent that cause the aerial vehicle to terminate a flight and be routed to a calibration station for a full calibration, as in 1324. In some instances, this may include the aerial vehicle ascending to a defined altitude (e.g., ninety meters) and navigating directly to a calibration station. In other examples, it may result in the aerial vehicle descending and powering down at the delivery destination or another safe area.

If it is determined that the respective correction thresholds have not been exceeded, a determination is made as to whether one or more of the determined variations are within a tolerance range, as in 1326. The tolerance range may be any range of variation below a respective correction threshold. For example, a tolerance range may be any variation between two percent and eight percent of variation. In other implementations, the tolerance range may be any variation below a respective correction threshold.

If it is determined that a variation is within a tolerance range, instructions are sent that result in an adjustment, or software correction of the variation, as in 1328. For example, adjustment instructions may be sent that cause the aerial vehicle to adjust image information based on a difference determined as the variation. Upon providing instructions to adjust or software correct the sensor, the example process 1300 returns to block 1318 and continues. In some implementations, rather than returning to block 1318 and continuing, the example process may complete and allow the aerial vehicle to continue flight after the camera has been adjusted or a software adjustment performed based on the variation. In still other implementations, no adjustment may be performed and, provided the variation is within the tolerance range, operation of the aerial vehicle may be allowed to continue.

Returning to the example described with respect to FIG. 13, if it is determined at decision block 1326 that the variations are not within respective tolerance ranges (i.e., the variations are below the respective tolerance ranges), the example process completes and the aerial vehicle continues its flight away from the delivery destination, as in 1330.

While some of the examples discussed herein describe an aerial vehicle management system processing sensor information (e.g., images) and/or comparing processed information with actual information to determine variations, in other implementations, the aerial vehicle may process the sensor information and/or compare the processed information with actual information. Accordingly, it will be appreciated that several aspects of the implementations described herein may be performed by the aerial vehicle, the aerial vehicle management system, and/or a combination of the aerial vehicle and the aerial vehicle management system.

Figure 14:
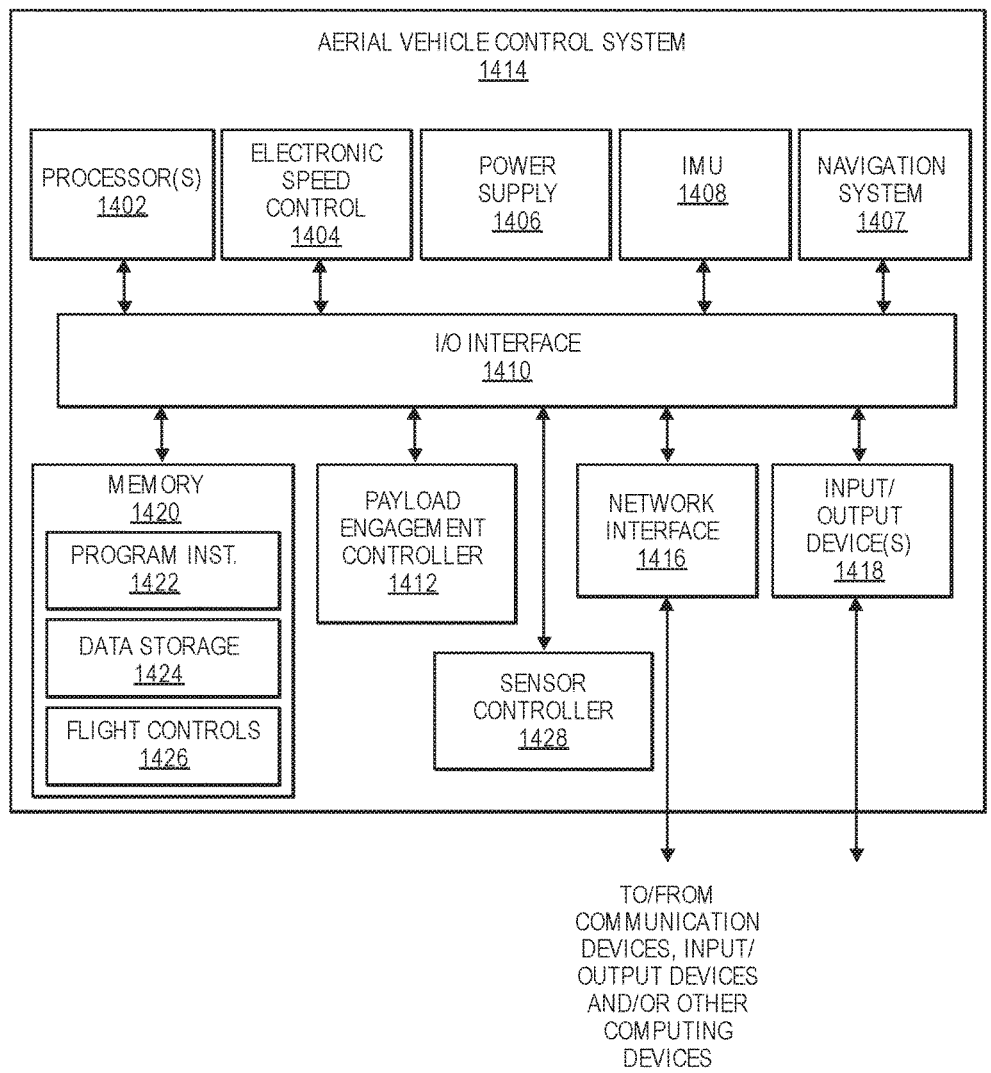
FIG. 14 is a block diagram of an illustrative implementation of an aerial vehicle control system that may be used with various implementations.

FIG. 14 is a block diagram illustrating an example aerial vehicle control system 1414. In various examples, the block diagram may be illustrative of one or more aspects of the aerial vehicle control system 1414 that may be used to implement the various systems and methods discussed herein and/or to control operation of the aerial vehicles described herein. In the illustrated implementation, the aerial vehicle control system 1414 includes one or more processors 1402, coupled to a memory, e.g., a non-transitory computer readable storage medium 1420, via an input/output (I/O) interface 1410. The aerial vehicle control system 1414 may also include electronic speed controls 1404 (ESCs), power supply modules 1406, a navigation system 1407, and/or a payload engagement controller 1412. In some implementations, the navigation system 1407 may include an inertial measurement unit (IMU) 1408. The aerial vehicle control system 1414 may also include a network interface 1416, and one or more input/output devices 1418.

In various implementations, the aerial vehicle control system 1414 may be a uniprocessor system including one processor 1402, or a multiprocessor system including several processors 1402 (e.g., two, four, eight, or another suitable number). The processor(s) 1402 may be any suitable processor capable of executing instructions. For example, in various implementations, the processor(s) 1402 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1402 may commonly, but not necessarily, implement the same ISA.

The non-transitory computer readable storage medium 1420 may be configured to store executable instructions, data, flight paths, flight control parameters, actual information about markers and/or objects, and/or data items accessible by the processor(s) 1402. Data items may include, for example, images obtained from one or more of the imaging elements, distance information, shape information, size information, position information, orientation information, pattern information, combined image information (e.g., depth information), etc.

In various implementations, the non-transitory computer readable storage medium 1420 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 1420 as program instructions 1422, data storage 1424 and flight controls 1426, respectively. In other implementations, program instructions, data, and/or flight controls may be received, sent, or stored upon different types of computer-accessible media, such as non-transitory media, or on similar media separate from the non-transitory computer readable storage medium 1420 or the aerial vehicle control system 1414. Generally speaking, a non-transitory, computer readable storage medium may include storage media or memory media such as magnetic or optical media, e.g., disk or CD/DVD-ROM, coupled to the aerial vehicle control system 1414 via the I/O interface 1410. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 1416.

In one implementation, the I/O interface 1410 may be configured to coordinate I/O traffic between the processor(s) 1402, the non-transitory computer readable storage medium 1420, and any peripheral devices, the network interface 1416 or other peripheral interfaces, such as input/output devices 1418. In some implementations, the I/O interface 1410 may perform any necessary protocol, timing or other data transformations to convert data signals from one component (e.g., non-transitory computer readable storage medium 1420) into a format suitable for use by another component (e.g., processor(s) 1402). In some implementations, the I/O interface 1410 may include support for devices attached through various types of peripheral buses, such as a variant of the Peripheral Component Interconnect (PCI) bus standard or the Universal Serial Bus (USB) standard, for example. In some implementations, the function of the I/O interface 1410 may be split into two or more separate components, such as a north bridge and a south bridge, for example. Also, in some implementations, some or all of the functionality of the I/O interface 1410, such as an interface to the non-transitory computer readable storage medium 1420, may be incorporated directly into the processor(s) 1402.

The ESCs 1404 communicate with the navigation system 1407 and adjust the rotational speed of each lifting motor and/or the thrusting motor to stabilize the UAV and guide the UAV along a determined flight path. The navigation system 1407 may include a GPS, indoor positioning system (IPS), IMU or other similar systems and/or sensors that can be used to navigate the UAV 100 to and/or from a location. The payload engagement controller 1412 communicates with actuator(s) or motor(s) (e.g., a servo motor) used to engage and/or disengage items.

The network interface 1416 may be configured to allow data to be exchanged between the aerial vehicle control system 1414, other devices attached to a network, such as other computer systems (e.g., remote computing resources), and/or with aerial vehicle control systems of other UAVs. For example, the network interface 1416 may enable wireless communication between the UAV that includes the control system 1414 and an aerial vehicle control system that is implemented on one or more remote computing resources. For wireless communication, an antenna of an UAV or other communication components may be utilized. As another example, the network interface 1416 may enable wireless communication between numerous UAVs. In various implementations, the network interface 1416 may support communication via wireless general data networks, such as a Wi-Fi network. For example, the network interface 1416 may support communication via telecommunications networks, such as cellular communication networks, satellite networks, and the like.

Input/output devices 1418 may, in some implementations, include one or more displays, imaging devices, thermal sensors, infrared sensors, time of flight sensors, accelerometers, pressure sensors, weather sensors, imaging elements (e.g., cameras), gimbals, landing gear, etc. Multiple input/output devices 1418 may be present and controlled by the aerial vehicle control system 1414. One or more of these sensors may be utilized to assist in landing as well as to avoid obstacles during flight.

As shown in FIG. 14, the memory may include program instructions 1422, which may be configured to implement the example processes and/or sub-processes described herein. The data storage 1424 may include various data stores for maintaining data items that may be provided for determining flight paths, landing, identifying locations for disengaging items, engaging/disengaging the thrusting motors, processing sensor information, determining variations, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

The aerial vehicle control system 1414 may also include the sensor controller 1428. The sensor controller may communicate with the sensors to receive sensor measurements and/or sensor information. Likewise, the sensor controller 1428 may also communicate with the aerial vehicle management system to obtain actual information about objects and/or markers (or may store such information in a memory of the aerial vehicle), process obtained sensor information to generate processed information, and/or compare processed information with actual information to determine variations.

Those skilled in the art will appreciate that the aerial vehicle control system 1414 is merely illustrative and is not intended to limit the scope of the present disclosure. In particular, the computing system and devices may include any combination of hardware or software that can perform the indicated functions. The aerial vehicle control system 1414 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 1414. Some or all of the system components or data structures may also be stored (e.g., as instructions or structured data) on a non-transitory, computer-accessible medium or a portable article to be read by an appropriate drive. In some implementations, instructions stored on a computer-accessible medium separate from the aerial vehicle control system 1414 may be transmitted to the aerial vehicle control system 1414 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other aerial vehicle control system configurations.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An unmanned aerial vehicle (UAV) flight departure verification apparatus comprising:
   a channel through which a UAV aerially navigates as the UAV is departing a materials handling facility;
   a plurality of sensors positioned within the channel and configured to obtain information about the UAV as the UAV aerially navigates through the channel, the plurality of sensors including:
      a microphone positioned within the channel and configured to receive sound generated by the UAV as the UAV aerially navigates through the channel;
      a camera positioned within the channel and configured to form a plurality of images, each of the plurality of images including a representation of the UAV as the UAV aerially navigates through the channel; and
      a distance determining element configured to determine a distance between the distance determining element and the UAV as the UAV aerially navigates through the channel;
   an aerial vehicle management system in communication with each of the plurality of sensors and in communication with the UAV, the aerial vehicle management system configured to at least:
      receive channel information, the channel information including:
         the sound received from the microphone;
         the plurality of images formed by the camera; and
         distance information representative of the distance determined by the distance determining element;
      receive from the UAV, UAV information, the UAV information including at least one of:
         revolution per minute ("RPM") information corresponding to a motor of the UAV;
         altitude information corresponding to an altitude of the UAV;
         position information corresponding to a position of the UAV;
         pose information corresponding to a pose of the UAV;
         heading information corresponding to a heading of the UAV; or
         velocity information corresponding to a velocity of the UAV;
      process the channel information and the UAV information to determine a plurality of variations between the channel information and the UAV information;
      determine that each of the plurality of variations are within a respective tolerance range; and
      for each of the plurality of variations, provide correction information to the UAV to alter a calibration of a respective sensor of the UAV, wherein the correction information is based at least in part on the variation.

2. The UAV flight departure verification apparatus of claim 1, wherein:
   the plurality of variations include an RPM variation, the RPM variation determined based at least in part on the RPM information corresponding to the motor of the UAV as received from the UAV and an actual RPM determined based at least in part on a processing of the plurality of images; and the RPM variation corresponds to a difference between the RPM information and the actual RPM.

3. The UAV flight departure verification apparatus of claim 1, wherein:

the plurality of variations include an altitude variation, the altitude variation determined based at least in part on the altitude information received from the UAV and an actual altitude of the UAV determined based at least in part on the distance information; and the altitude variation corresponds to a difference between the altitude information received from the UAV and the actual altitude.

4. The UAV flight departure verification apparatus of claim 1, wherein:

the plurality of variations include a position variation, the position variation determined based at least in part on the position information received from the UAV and an actual position of the UAV determined based at least in part on a processing of the plurality of images or based at least in part on the distance information; and the position variation corresponds to a difference between the position information received from the UAV and the actual position.

5. The UAV flight departure verification apparatus of claim 1, wherein:

the plurality of variations include a pose variation, the pose variation determined based at least in part on the pose information received from the UAV and an actual pose of the UAV determined based at least in part on a processing of the plurality of images; and the pose variation corresponds to a difference between the pose information received from the UAV and the actual pose of the UAV.

6. The UAV flight departure verification apparatus of claim 1, wherein:

the plurality of variations include a heading variation, the heading variation determined based at least in part on the heading information received from the UAV and an actual heading of the UAV determined based at least in part on a processing of the plurality of images; and the heading variation corresponds to a difference between the heading information received from the UAV and the actual heading.

7. The UAV flight departure verification apparatus of claim 1, wherein:

the plurality of variations include a velocity variation, the velocity variation determined based at least in part on the velocity information received from the UAV and an actual velocity of the UAV determined based at least in part on a processing of the plurality of images; and the velocity variation corresponds to a difference between the velocity information received from the UAV and the actual velocity.

8. An unmanned aerial vehicle ("UAV") sensor calibration method, comprising:

detecting a UAV aerially navigating through a channel;
collecting, with a plurality of sensors positioned within the channel, channel information that includes at least one of:
an actual position of the UAV within the channel,
a plurality of images, each of the plurality of images including a representation of the UAV as the UAV aerially navigates through the channel; or
a sound generated by the UAV as the UAV aerially navigates through the channel;

receiving from the UAV, UAV information, the UAV information including information recorded by one or more of a plurality of sensors coupled to the UAV;

processing the channel information and the UAV information to determine a variation between the channel information and the UAV information;

determining that the variation is within a tolerance range; and authorizing the UAV to continue a flight toward a destination.

9. The method of claim 8, further comprising:

in response to determining that the variation is within a tolerance range, providing correction information to the UAV to alter a calibration of at least one sensor, wherein the correction information is based at least in part on the variation.

10. The method of claim 8, further comprising:

determining that the variation does not exceed a correction threshold.

11. The method of claim 8, wherein the variation indicates a difference between the channel information and the UAV information.

12. The method of claim 8, further comprising:

receiving from the UAV, image information representative of an image formed by a camera coupled to the UAV as the UAV is aerially navigating through the channel, the image including a representation of at least a portion of the channel; and processing the image information to determine an image variation between the at least a portion of the channel as represented in the image and an actual at least a portion of the channel.

13. The method of claim 12, wherein the actual at least a portion of the channel includes a marker having a known shape, a known size, and a known color.

14. The method of claim 12, further comprising:

determining that the image variation is within an image tolerance range; and allowing the UAV to continue a flight toward a destination.

15. An aerial vehicle calibration system, comprising:

a channel through which an aerial vehicle aerially navigates as the aerial vehicle departs a materials handling facility;

the channel including a plurality of sensors configured to obtain information about the aerial vehicle as the aerial vehicle aerially navigates through the channel;

an aerial vehicle management system in communication with the plurality of sensors, the aerial vehicle management system configured to at least:

process the information received from the plurality of sensors to determine if one or more sensors coupled to the aerial vehicle needs calibration prior to a departure of the aerial vehicle from the materials handling facility; and in response a determination that one or more sensors of the aerial vehicle needs calibration, cause the one or more sensors of the aerial vehicle to be calibrated prior to the departure of the aerial vehicle from the materials handling facility.

16. The aerial vehicle calibration system of claim 15, wherein the one or more sensors are manually calibrated by an agent prior to departure of the aerial vehicle from the materials handling facility.

17. The aerial vehicle calibration system of claim 15, wherein:
- the aerial vehicle management system processes the information to determine a variation for each of the one or more sensors coupled to the aerial vehicle; and
- the aerial vehicle management system is further configured to at least:
  - determine that at least one variation exceeds a correction threshold; and
  - cause the aerial vehicle is to be routed to a calibration station for a full calibration.

18. The aerial vehicle calibration system of claim 15, wherein the plurality of sensors include a camera, a distance determining element, a laser, or a microphone.

19. The aerial vehicle calibration system of claim 15, wherein the aerial vehicle management system is in communication with the aerial vehicle and receives aerial vehicle information from the aerial vehicle as the aerial vehicle is aerially navigating through the channel.

20. The aerial vehicle calibration system of claim 19, wherein the aerial vehicle management system processes the information received from the plurality of sensors to determine a variation between the information and the aerial vehicle information.

\* \* \* \* \*